United States Patent
Buga et al.

(10) Patent No.: US 8,340,067 B2
(45) Date of Patent: Dec. 25, 2012

(54) SYSTEMS AND METHODS FOR WIRELESS TRANSFER OF CONTENT BETWEEN AIRCRAFT

(75) Inventors: Wladyslaw Jan Buga, Rancho Santa Fe, CA (US); Tracy Raymond Trent, San Diego, CA (US)

(73) Assignee: Proximetry, Inc., San Diego, CA (US)

( * ) Notice: Subject to any disclaimer, the term of this patent is extended or adjusted under 35 U.S.C. 154(b) by 0 days.

(21) Appl. No.: 13/219,834

(22) Filed: Aug. 29, 2011

(65) Prior Publication Data

US 2012/0003922 A1 Jan. 5, 2012

Related U.S. Application Data

(63) Continuation of application No. 12/210,160, filed on Sep. 12, 2008, now abandoned.

(60) Provisional application No. 60/971,823, filed on Sep. 12, 2007.

(51) Int. Cl.
*H04W 4/00* (2006.01)
(52) U.S. Cl. ...................................... 370/338
(58) Field of Classification Search .................. None
See application file for complete search history.

(56) References Cited

U.S. PATENT DOCUMENTS

| | | | |
|---|---|---|---|
| 5,524,272 | A | 6/1996 | Podowski |
| 5,646,761 | A | 7/1997 | Medved |
| 6,167,238 | A | 12/2000 | Wright |
| 6,167,239 | A | 12/2000 | Wright |
| 6,356,228 | B1 | 3/2002 | Tomita |
| 6,529,706 | B1 | 3/2003 | Mitchell |
| 6,671,589 | B2 | 12/2003 | Holst |
| 6,810,527 | B1 | 10/2004 | Conrad |
| 6,870,487 | B2 | 3/2005 | Nuesser |
| 7,082,706 | B1 | 8/2006 | Stinis |
| 7,356,336 | B2 | 4/2008 | Perez |
| 7,486,960 | B2 | 2/2009 | Brady, Jr. |
| 7,519,014 | B2 | 4/2009 | Allen |
| 7,593,999 | B2 | 9/2009 | Nathanson |
| 7,620,364 | B2 | 11/2009 | Higashida |
| 7,630,710 | B2 | 12/2009 | Kauffman |
| 7,693,527 | B2 | 4/2010 | Krstulich |
| 7,769,376 | B2 | 8/2010 | Wright |
| 7,791,473 | B2 | 9/2010 | Allen |

(Continued)

FOREIGN PATENT DOCUMENTS

EP 1926234 12/2008

(Continued)

*Primary Examiner* — Otis L Thompson, Jr.
(74) *Attorney, Agent, or Firm* — Letham Law Firm LLC; Lawrence Letham

(57) ABSTRACT

A system for wirelessly transferring content between aircraft. The system includes a first local controller positioned on a first aircraft of the plurality of aircraft and a respective second local controller positioned on each of the other aircraft of the plurality of aircraft. The aircraft are positioned on the ground within a boundary of an airport. The first local controller cannot detect a regional controller or any of the second local controllers. The first local controller: identifies content assigned to but not available on the first local controller and the one or more second local controllers, the content assigned by an administrator; detects content available on the first local controller and the one or more second local controllers; and controls transfer of content between the first local controller and the one or more second local controllers.

18 Claims, 17 Drawing Sheets

One Embodiment of a GateSync (GS) System

U.S. PATENT DOCUMENTS

| | | | |
|---|---|---|---|
| 7,808,377 B2 * | 10/2010 | Shafaat et al. | 340/506 |
| 7,908,042 B2 | 3/2011 | Brinkely | |
| 8,010,141 B2 | 8/2011 | Buga | |
| 8,023,936 B2 * | 9/2011 | Hudson et al. | 455/421 |
| 8,050,696 B2 | 11/2011 | Buga | |
| 8,116,797 B2 | 2/2012 | Brady, Jr. | |
| 2002/0059614 A1 | 5/2002 | Lipsanen | |
| 2002/0138352 A1 | 9/2002 | Demaggio | |
| 2003/0032426 A1 | 2/2003 | Gilbert | |
| 2003/0045286 A1 * | 3/2003 | Taylor | 455/431 |
| 2004/0215373 A1 | 10/2004 | Won | |
| 2005/0090201 A1 | 4/2005 | Lengies | |
| 2005/0222933 A1 | 10/2005 | Wesby | |
| 2005/0256616 A1 | 11/2005 | Rhoads | |
| 2005/0286452 A1 | 12/2005 | Hardgrave | |
| 2006/0009262 A1 | 1/2006 | Hamm | |
| 2006/0271970 A1 * | 11/2006 | Mitchell et al. | 725/82 |
| 2007/0042774 A1 | 2/2007 | Alcorn | |
| 2007/0127460 A1 | 6/2007 | Wilber | |
| 2007/0139169 A1 | 6/2007 | Mitchell | |
| 2007/0179701 A1 | 8/2007 | Hamilton | |
| 2007/0252734 A1 | 11/2007 | Greiner | |
| 2007/0255850 A1 | 11/2007 | Gould | |
| 2008/0004000 A1 | 1/2008 | Boss | |
| 2008/0004967 A1 | 1/2008 | Gillen | |
| 2008/0187282 A1 * | 8/2008 | Brady et al. | 386/66 |
| 2009/0092074 A1 | 4/2009 | Jamalipour | |
| 2009/0103452 A1 * | 4/2009 | Horvath | 370/254 |
| 2009/0167513 A1 | 7/2009 | Hill | |
| 2009/0234859 A1 | 9/2009 | Grigsby | |
| 2010/0036547 A1 | 2/2010 | Myers | |
| 2010/0087190 A1 * | 4/2010 | Pandit et al. | 455/431 |
| 2010/0142482 A1 | 6/2010 | Lu | |
| 2010/0162326 A1 * | 6/2010 | Bonar | 725/77 |
| 2010/0167723 A1 | 7/2010 | Soumier | |
| 2010/0224732 A1 | 9/2010 | Olson | |
| 2010/0232295 A1 | 9/2010 | True | |
| 2010/0256865 A1 | 10/2010 | Ying | |
| 2011/0028178 A1 | 2/2011 | Brady | |
| 2011/0149849 A1 | 6/2011 | Brownrig | |
| 2012/0072364 A1 | 3/2012 | Ho | |

FOREIGN PATENT DOCUMENTS

| | | |
|---|---|---|
| EP | 2068592 | 6/2009 |
| EP | 2093909 | 8/2009 |
| EP | 2229034 | 9/2010 |
| GB | 2373655 | 9/2002 |
| WO | WO2006135533 | 12/2006 |
| WO | WO2007034387 | 3/2007 |
| WO | WO2007059333 | 5/2007 |
| WO | WO2008092475 | 8/2008 |
| WO | WO2011020180 | 2/2011 |

* cited by examiner

One Embodiment of a
GateSync (GS) System

One Embodiment of a GS Hierarchical and Distributed Architecture

An Example Connectivity Graph for a Regional Community in Accordance with One Embodiment of the Invention One Embodiment of an RC Implementation One Embodiment of a Local Controller One Embodiment of a Basic
GateSync Operational and
Peering Scheme 800 

Show Packages List    Show AirPlanes List    Update Departure Times

| 810<br>Group hierarchy | 820<br>Name | 830<br>View |
|---|---|---|
| AirCanada, Regular, Origin AirPort, Calgary, ACA155. | FIN#933 | details |
| AirCanada, Regular, Origin AirPort, Edmonton, ACA179. | FIN#943 | details |
| AirCanada, Regular, Origin AirPort, Halifax, ACA660. | FIN#912 | details |
| AirCanada, Regular, Origin AirPort, Las Vegas, ACA575. | FIN#951 | details |
| AirCanada, Regular, Origin AirPort, Los Angeles, ACA797. | FIN#945 | details |
| AirCanada, Regular, Origin AirPort, New York, ACA740. | FIN#488 | details |
| AirCanada, Regular, Origin AirPort, New York, ACA742. | FIN#939 | details |
| AirCanada, Regular, Origin AirPort, Orlando, ACA1206. | FIN#934 | details |
| AirCanada, Regular, Origin AirPort, Ottawa, ACA143. | FIN#298 | details |
| AirCanada, Regular, Origin AirPort, San Francisco, ACA761. | FIN#935 | details |

FIG. 8
An Example Aircraft List

900 

910

AirCanada. Regular. Origin AirPort. Edmonton. ACA179.
Departure time: 2007-01-16 09:05:00.

Group: [ACA179 ▾] [submit]

920

| Application name | Rule Name | Rule Value | Linked to |
|---|---|---|---|
| News Broadcast | Bandwidth | 1000-1500 | Role |
| News Broadcast | Priority | 1 | Role |
| Narrowcast | Bandwidth | 1000-1500 | Role |
| Narrowcast | Priority | 1 | Role |
| Broadcast | Bandwidth | 2500-3000 | Role |
| Broadcast | Priority | 1 | Role |
| Data | Bandwidth | 800-1500 | Role |
| Data | Priority | 1 | Role |

930

| Content Type | Name | Service Flow |
|---|---|---|
| Manifest | Manifest ACA179 | Data Transfer |

FIG. 9
An Example of Aircraft Details

1000

| | Name | | View |
|---|---|---|---|
| Ads Package 1 | | | details |
| Ads Package 2 | 1010 | | details 1020 |
| Ads Package 3 | | | details |
| Babel | | | details |
| Casino Royale | | | details |
| Spider Man | | | details |
| The Departed | | | details |
| US News 12/19/06 morning | | | details |
| US News 12/19/06 afternoon | | | details |
| US News 12/19/06 evening | | | details |

Show Packages List    Show AirPlanes List    Update Departure Times

An Example of Aircraft Content Assignment

An Example of an Embodiment of a
Media Information Distribution
Algorithm in Accordance with the
Present Invention An Example of an Embodiment of a
Wireless Network Configuration and
Radio Resource Allocator Algorithm
in Accordance with the Present
Invention

1300

Priorities for Role "Landing"
Upload of Client Data, Priority 1, Bandwidth Reserved
Download of Multicast Media, Priority 7, Best Effort

Priorities for Role "At Gate"
Download of Multicast Media, Priority 5, Best Effort

Priorities for Role "Departing"
Passenger Manifest Data, Priority 1, Bandwidth Reserved
Download of Multicast Media, Priority 7, Best Effort

Priorities for Role "Dept Ready"
Unicast Media Download (News), Priority 2, Bandwidth Reserved
Download of Multicast Media, Priority 7, Best Effort FIG. 13
An Example of Roles and
Associated Priorities Examples of Available and
Assigned Advertisement Items for
Upload to Aircraft

SYSTEMS AND METHODS FOR WIRELESS TRANSFER OF CONTENT BETWEEN AIRCRAFT

CROSS-REFERENCE TO RELATED APPLICATIONS

This application is a continuation of and claims priority under 35 U.S.C. §120 from U.S. patent application Ser. No. 12/210,160 by Buga filed Sep. 12, 2008, now abandoned which claims priority under 35 U.S.C. §119(e) from U.S. patent application No. 60/971,823 by Buga filed Sep. 12, 2007, each of the aforementioned applications is herein incorporated by reference.

FIELD OF THE INVENTION

The present invention relates generally to wireless delivery of multi-media content. More particularly but not exclusively, the present invention relates to systems and methods for delivering wireless content to aircraft on the ground or in the vicinity of an airport or other ground facility.

BACKGROUND OF THE INVENTION

Modern aircraft, such as those used by commercial airlines, use In Flight Entertainment (IFE) management systems to manage the distribution of data and multimedia content to various aircraft systems, and monitor consumption of digital video and other content. In addition, IFE systems manage distribution of these assets within the aircraft and transfer of data and content to and from the IFE. This is currently done with a device known as a Portable Data Loader (PDL), which is a notebook computer manually carrier onboard an aircraft and synchronized, typically with a wired connection, with the IFE system.

Unfortunately, these PDL systems have a number of drawbacks, including significant costs, lack of real time transmission and update capabilities, lack of distribution flexibility, lack of remote communication with aircraft tracking systems, as well as other disadvantages. Accordingly, there is a need in the art for improved systems for distributing multimedia content to aircraft.

SUMMARY OF THE INVENTION

The present invention is related generally to data and multimedia content provisioning for aircraft using wireless networks.

In one aspect, the present invention is directed to systems for intelligently providing media content to aircraft using wireless connections.

In another aspect, the present invention is directed to methods for intelligently providing media content to aircraft via wireless connections.

Additional aspects of the present invention are further described and illustrated herein with respect to the following detailed description and appended drawings.

BRIEF DESCRIPTION OF THE DRAWING

For a better understanding of the nature of the features of the invention, reference should be made to the following detailed description taken in conjunction with the accompanying drawings, in which:

FIG. 8 illustrates one embodiment of a screen shot view showing a list of aircraft, in accordance with aspects of the present invention;

FIG. 9 illustrates one embodiment of a screen shot view showing aircraft details, in accordance with aspects of the present invention;

FIG. 13 illustrates an example of roles and associated priorities in accordance with one embodiment of the present invention;

DETAILED DESCRIPTION OF THE PREFERRED EMBODIMENTS

Figure 1:
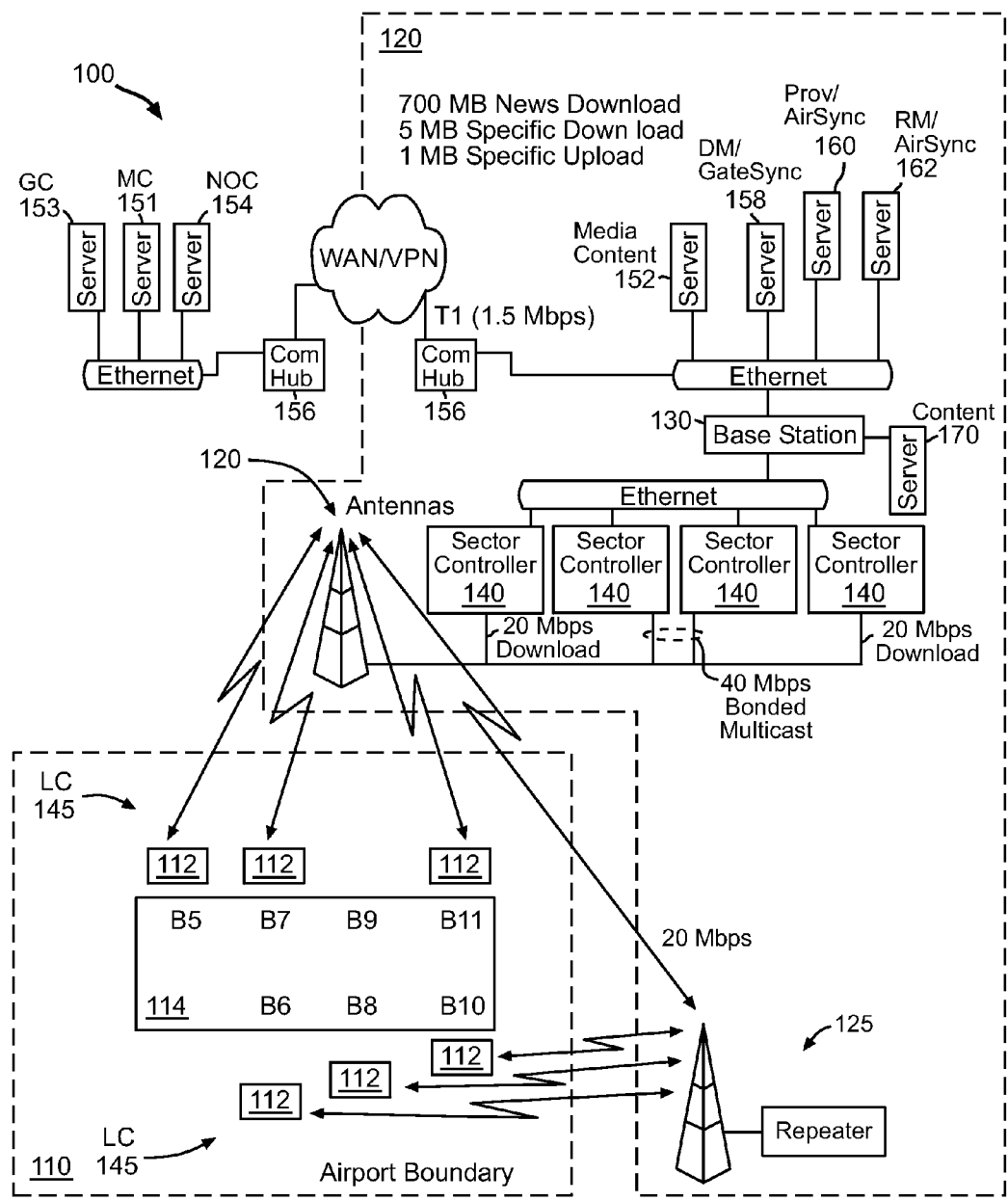
FIG. 1 illustrates one embodiment of a GateSync (GS) system implementation, in accordance with aspects of the present invention.

This application is related to U.S. Utility patent application Ser. No. 11/754,066, entitled SYSTEMS AND METHODS FOR WIRELESS RESOURCE MANAGEMENT, U.S. Utility patent application Ser. No. 11/754,083, entitled SYSTEMS AND METHODS FOR WIRELESS RESOURCE MANAGEMENT WITH MULTI-PROTOCOL MANAGEMENT, and to U.S. Utility patent application Ser. No. 11/754,093, entitled SYSTEMS AND METHODS FOR WIRELESS RESOURCE MANAGEMENT WITH QUALITY OF SERVICE (QOS) MANAGEMENT. The content of each of these applications is hereby incorporated by reference herein for all purposes. These applications may be denoted herein collectively as the "related applications" for purposes of brevity.

With the emergence of new broadband wireless technologies such as WiMAX (IEEE 802.16), mesh networks, and other emerging networking technologies, there is an opportunity to establish wireless networking as a potentially new paradigm of media distribution. Aircraft, such as commercial airliners and their onboard devices, can be connected by wireless broadband networks to airline and service provider operations for performing various IT related business functions, including data, media and information exchanges, deliveries, and distributions. All of this can be accomplished by using one or more dedicated, on or off airport base stations communicating directly with onboard aircraft radio transceivers.

In accordance with the present invention, embodiments of a media/content distribution system, also denoted herein as a GateSync (GS) system, are described. A GS system is configured to enable intelligent data and multi-media information distribution and exchange to and/or from aircraft, either while on the ground or in the vicinity of the ground, using wireless networks. For example, aircraft owned by commercial airlines such as United Airlines or American Airlines may be wirelessly connected to a GS system while on the ground at a gate or terminal, in a parking area, or while taxiing to or from runways, terminals or other airport locations, with data and/or media uploaded or downloaded from the aircraft.

In a typical embodiment, a GS system may include content/media management servers, media distribution routers, wireless base stations and/or repeaters (transmitter(s) and receiver (s)), multiple antenna systems, mobile and stationary wireless nodes with single or multiple transmitters, as well as receivers and antennas. Management and control software agents, which are application programs/modules providing device and/or system management functionality, may be present on some or all GS components for enabling management and configuring and controlling communication between various connected GS components. The related applications describe embodiments of the use of such agents in a wireless network such as the wireless networks described herein.

The GS components may be configured generally into Regional Controllers (RCs) configured to communication with multiple Local Controllers (LCs), which are typically installed onboard aircraft and configured to be in wireless communication with a Base Station (BS) integral with or coupled to the RC. These various system components may further be communicatively coupled to a Network Operations Center (NOC) that includes interfaces, such as GUIs or other user interfaces, that are configured to allow operators to manage and control system wide operation to the various GS components, including the RCs and LCs, as well as the content to be loaded and retrieved from the aircraft. In addition, a GS system may include or be coupled with one or Global Controllers (GCs) that may also be coupled to the RCs to provide content. A typical GC will be assigned to a particular airline to allow the airline to provisional appropriate content to its respective aircraft at various RCs.

In addition to the various GS embodiments further described below with respect to the drawings, in some embodiments, the following components and functional capabilities may also be included in GS system implementations.

Fountain Codes—Fountain codes may be used to ensure delivery of content in a noise and/or error prone environment. Fountain codes have been shown to be useful for multicast problems such as may arise in some embodiments of the present invention. Use of such fountain codes are described in, for example, M. Luby, "LT Codes," Proc. Of IEEE Symposium on the Foundations of Computer Science (FOCS), 2002, pp. 271-280, and in U.S. Pat. No. 6,307,487, both of which are incorporated by reference herein in their entirety.

Remote login for maintenance functionality—This capability may be provided to operation staff at the Network Operations Center (NOC) or to aircraft maintenance staff or airlines staff tasked with managing content to gain insight into the status of on aircraft devices, such as the local controllers (LCs), or status of other GC components. The operator is provided with an interface in the NOC to check that content is indeed properly transferred (validating reporting) to the various aircraft, debug systems that are reported to be malfunctioning, restart devices or interfaces remotely, and/or collect information on system usage such as memory or CPU cycles that may be causing performance degradation or unreliability. In some applications, the ability to do this without physically boarding an aircraft is important as it permits technical and system expertise to be applied to potential failures without using critical aircraft down time and/or without going through the process of gaining permission to access sensitive airport locations or sensitive aircraft spaces.

Interface to multiple avionics systems—in some embodiments, a GS system may be configured to act as a "mailbox," for transferring files and/or data streams from onboard aircraft systems to offsite systems for distribution or analysis and from offsite systems to onboard systems for use. In addition to onboard entertainment systems (such as IFE systems and the like), there are many other data producing and consuming systems onboard a typical aircraft. Examples of these include ACARS (Aircraft Communication Addressing and Reporting System) and flight deck systems. One application of the present invention is the delivery and reporting of electronic flight bag data to the flight deck to update charts for navigation. Another ACARS application example is downloading log files of performance of avionics systems and scheduling of maintenance and logistics of spare parts based on time (such as hours) since the last service/maintenance and/or repair, as well as aircraft performance measurements.

These various aircraft onboard systems each have specific interface descriptions, with potentially proprietary interfaces and/or protocols. In some cases, an Ethernet connection may be physically adequate to access the systems, however, security requirements may be required or necessary in order to access data. For example, in the case of flight deck systems, a local controller (LC) as described herein may need to shut down all other communication interfaces while a dedicated connection is opened to transfer EFB content, then the interface is disconnected and other interfaces are reinitialized to communicate with other on or off aircraft systems. In typical embodiments, digital certificates may be used based on the specific requirements of each interface to improve performance.

Live feeds besides remote login—Live feeds may be enabled in GS implementations in certain embodiments. While the primary function of a typical GS system is to deliver data and media content efficiently, the infrastructure may also be used for providing real time services such as audio, video or VoIP between the aircraft (i.e., crew, cabin, passengers) and/or to off aircraft personnel or others. For example, aircraft crews may desire to call the terminal or airline controller to provide or receive instructions for cleaning crews or others during cabin preparation. Security personnel may monitor passenger or crew behavior over live video feeds. A wide variety of additional live feed applications that can be facilitated by a GS system in accordance with the present invention are also envisioned.

In some embodiments, multiple communication layers may be coordinated to implement optimization of networking algorithms in accordance with conditions such as channel characteristics and/or other specific profile information. This is described in further detail elsewhere herein, however, in general, coordination of OSI layer 1 (PHY), 2 (MAC) and 3 (IP), as well as, in some cases, higher layers such as layer 7 for content management, may be performed dynamically to optimize network performance against a specific usage profile. In one example, this involves maximizing network throughput (in Bytes, etc.). Other examples include guaranteeing priority deadlines before aircraft takeoff, providing the best connectivity to the weakest link, optimization of broadcast session, providing higher priority to premier customers, and the like.

Ability to shift profiles for system optimization—In some implementations, configuration coordination and tuning of multiple layers to optimize against a profile may be done. In this case optimization is dynamically implemented and changes based on triggers, such as presence of premier customer aircraft, incomplete transmission of critical data to aircraft due to depart, specified priorities from airlines as to content distribution timing, as well as others. This may be done by providing closed loop dynamic invocation of optimization profiles from a library of canned or predefined parameter sets.

Ability to coordinate reporting cross regional sites—In a typical embodiment a system in accordance with the present invention will be configured in hierarchical fashion, with two or more RCs coordinated by a GC. With this configuration, the GC manages media transmission and determine at which RC particular media content will be provided to particular aircraft. If an aircraft is traveling between two or more regions, this coordination may be done based on aircraft downtimes at particular airports, or based on other criteria. A central NOC may also be included which will provide a window into reporting from other system components, both for current status of devices, wireless links and content transfer, as well as for historical tracking of both of these, as well as other system collected information. In addition, security information may be stored for use in situations where the aircraft are not connected via broadband or other connectivity to an RC. The NOC will contain information as to upload and download requirements as well as last reported transactions, health of devices, and identities of LCs. Thus, for example, where GSM is the only means of communication it can be used to provide information guiding transactions for unconnected modes of exchange as are further described below.

"Mail drop scenario with unconnected BS and GS"—In cases where it is not desirable to establish an RC with broadband connectivity, a "mail drop" RC can be established. This RC implementation differs from the standard RC implementation in that it does not have its own broadband connection to pull down fresh content from the MC. Instead it uploads fresh content from aircraft that land at the associated airport to create a content cache, and then transfers that con-tent to other aircraft that don't have that particular content (for example, a single movie that is part of a monthly entertainment update). In this embodiment the RC functions similar to a standard RC, however, it uploads content as well as data from other aircraft, rather than from a central content distribution site.

No BS peer to peer—In some implementations, two aircraft having LCs will be present at the same airport, where the airport does not have an RC. Nevertheless, it may be desirable to exchange content between the aircraft so that any appropriate missing content stored on one aircraft can be exchanged with the other, and vice versa. In order to do this, the respective LCs may be configured to establish communications with each other and communicate to exchange the information. To facilitate this approach, LCs may get location information from GSM connectivity (or via other mechanisms, such as on board GPS systems or other aircraft positioning systems as a backup), and then determine which frequencies they may be permitted to use for radio communication. They may then try to establish communication with other aircraft and associated LCs based on this information. If the LC receives a response to its signals it then establishes a relationship with the other LC (for example, the first one to transmit may act as a "superpeer" and controls the transaction in a fashion similar to an RC) and uses metadata drawn from the GSM (or other connectivity) to establish security bonafides and content deltas across the two LCs. The content is then transmitted up and down link (absent the sophisticated optimization features) to update the respective content inventory of the LC and the superPeer (for example with the LC further configured to reboot in RC mode).

Data and information distribution algorithms—Content may be assigned a type, priority, aircraft association (such as based on type of aircraft, time of arrival/departure, flight number, etc.) to facilitate content distribution and loading. This may be mapped to the airline/aircraft, arrival and/or departure times, etc. The GS system may be further configured to dynamically adapt to changes in the underlying information (such as changes in aircraft, arrival and departure times, airports, local wireless conditions, etc.) to manipulate and modify how content provisioning and network configuration is done.

Examples of functionality that may be employed in various embodiments of a GS system in accordance with the present invention include: centralized data and content distribution and management, unicast (i.e. one source, several sinks (aircraft)) transmission, multicast or broadcast trans-mission, chunking/parallelization & multicast (Bit-Torrent like), fountain codes used for multicast (for example, modified by time to departure priority), scheduling based on dynamically monitored network map, distributed and multi-hop communication links, mailbox host modes, peer-to-peer connectivity (such as between LCs), dynamically configured mesh networks (such as between multiple LCs), relay communication links (between LCs and other LCs and/or LCs and BCs), determination of link performance characteristics (such as link performance margins, SNIRs, etc.), dynamic adjustment of modulation and data throughput rates (configuration/adaptation of PHY layer), advanced antenna system (such as space division access), dynamic time scheduling and dynamic content delivery selection, time bounded constraints, such as dynamic network and/or content distribution configuration based on aircraft landing and departure times, time bounded priorities and exceptions, node availability times (such as appearing and disappearing nodes (aircraft/LCs) within reach of a particular BS or RC), dynamic adjustment of communication infrastructure and protocols, use of TCP/UPD/IP, protocol overhead and performance management, dynamic configuration and adjustment of MAC protocols, as well as advanced antenna systems ((for example, beam forming, Multiple Input/Multiple Output (MIMO), 802.11, etc.).

To realize the above capabilities as well as others, typical GS implementations include the following elements: content/media management servers, media distribution routers, dedicated on or off-airport wireless base stations and/or repeaters (transmitter(s) and receiver(s)), advanced antenna systems, mobile and stationary wireless nodes with single or multiple transmitters, receivers and antennas. Management and control software agents, such as are described in the related applications, may be present on some or all GS components for the purpose of enabling management and controlling communication between the various GS components.

Attention is now directed to FIG. 1, which illustrates an embodiment of a typical GateSync (GS) system 100 (also denoted herein as "GS 100" for brevity). GS 100 includes communication and networking components configured to communicate with one or more aircraft 112 located on or near an airport facility 110. For example, the airport 110 may include a terminal building or buildings 114 with one or more gates B5-B11 where aircraft 112 may be parked, as shown in FIG. 1. Other airport configurations or other facility configurations are also contemplated. The aircraft 112 may also be transiting to or from the gates and/or other airport facilities or may also be located on runways or aircraft parking areas. Alternately, in some embodiments, the aircraft 112 may be taking off or landing at the airport while communicating with GS 100. Each aircraft 112 typically has an onboard with a local controller (LC) 145 configured to communicate with other LC 145s and/or with a Regional Controller (RC) 220 and Base Station (BS) 130 via a sector controller 140 through antenna 120 and/or repeater 125.

An LC 145 typically comprises hardware and software components installed on the aircraft 112. An LC 145 may include one or more processors, radios, antennas, computer hardware, software and/or interfaces for communicating with other aircraft devices, as well as the BS 130 and/or other aircraft 112. The radio components of the LC 145 may be shared with other onboard aircraft systems or other onboard aircraft radios. The LC 145 is typically coupled with the aircraft's IFE system to provide media content to the IFE.

In a typical situation, the aircraft 112 are parked for limited time intervals at the gates where they are within a reach of one or more base stations 130 that are configured for media delivery to the nodes (i.e., the aircraft 112 LC 145) via one or more sector controllers 140 through one or more antennas 120. In addition, one or more repeaters 125 may be used to provide additional coverage to the aircraft 112 by extending coverage range. FIG. 1 illustrates example link speeds between various communication components, such as 20 Mbps between repeater 125 and antenna 120, however, these link speeds are shown for purposes of illustration, not limitation. Accordingly, other link speeds and connectivity, either fixed or dynamically determined, may also be supported by various embodiments.

Antennas 120 may be located on the airport facility boundary in some embodiments; however, in some embodiments it may be desirable to locate one or more of the antennas 120 offsite, such as at a location near to the airport but not on the airport facility. This is illustrated in FIG. 1, where antenna 120 and repeater 125 are located off of the airport boundary. This implementation may be useful for business or regulatory reasons, such as to minimize on-site costs or other regulatory burdens, or for other reasons. Antennas 120 are connected to one or more sector controllers 140, with the sector controllers configured to communicate to various regions of the airport or to various aircraft within a region. For example, an antenna 120 may be a directional antenna with coverage to aircraft in a 60% (or other angular) direction, with a corresponding sector controller matched to the particular antenna and coupled to the BS 130.

In addition an RC 220 may include servers 158, 160, 162 and 170 configured to receive, store, prepare and/or deliver media content to the aircraft 112. The media content may be provisioned as further described below and stored on a content server 170 or 152 to then be provided to one or more aircraft 112. The system may be configured to optimize the transport of these "media packages" to each aircraft and corresponding flight through the base station 130.

In the embodiment illustrated in FIG. 1, the RC 220 comprises one or more media/content servers 152, one or more communication hubs 156, one or more Device Management (DM) servers 158, Resource Management (RM) servers 162, as well as one or more Provisioning/AirSync Servers (PS) 160. It is noted that, in some embodiments, the functionality associated with these various servers may be combined in one more physical servers or other computer systems so as to reduce the number of physical components in a system. Likewise, in some embodiments the functionality associated with these various components may be distributed in two or more physical computer systems to provide redundancy and/or distributed processing capability. The processing functionality provided by these components is further described below.

Provisioning Servers (PS) 160 are systems including hardware, software and/or software/hardware combinations in the form of modules configured to provide an interface and management functionality to GS 100 System Administrators, also denoted herein as "Operators." The Operators may be persons associated with particular airlines or groups of airlines who are responsible for content selection and provisioning, or may be overall system operators or administrators with similar duties. The functionality associated with PS 160 may be provided directly through PS 160 to the operators, such as no a display screen or other user inter-face, and/or may be provided through a separate Control/Admin computer system such as GC server 153, Media Center (MC) server 151, and/or NOC server 154 as shown in FIG. 1. These capabilities allows for remote access to provisioning functionality through a WAN or VPN in conjunction with a Communications Hub (Com Hub) 156. PS 160 typically stores information regarding network operation policy, provisioned services and security needs and requirements, as well as other information related to content provisioning and delivery. In a typical embodiment, PS 160, either alone or in conjunction with Control/Admin Computer 153, provides an operator front end interface for access to and use of the system to facilitate media content provisioning. It may be configured to serve WebServices calls (by, for example, SOAP protocol) from an associated Graphical User Interface (GUI), or from another system (such as Computer 153, or another networked computer system such as asset management system (not shown), network management system (not shown), or other system.

Device Management (DM) Servers 158 are systems including hardware, software and/or software/hardware combinations in the form of modules configured to provide configure, control and enforce configuration data to managed network nodes, such as the Base Station 130, Sector Controllers 140, Local Controllers 145 and/or Repeaters 125. For example, in a typical embodiment, a DM module running on DM Server 158 is responsible for configuring and implementing secure and reliable communication protocols to the various nodes, as well as interfacing to network layers in supported nodes/devices.

Resource Management/AirSync (RM) Servers 162 are systems including hardware, software and/or software/hardware combinations in the form of modules configured to provide and manage overall system operation and make decisions regarding network behavior. This may include managing admitted services and associated quality levels, as well as network link quality analysis. Information gathered via DM modules from the network is provided to and processed and management by one or more RM modules, and then, based on the results of this data and network requirements, provisioning parameters and settings may be modified to adapt or adjust to current network performance and state.

Additional details regarding various embodiments of PS, DM and RM servers and associated processing is provided elsewhere herein as well as in the related applications.

Components DM 158, PS 160, RM 162, as well as other components such as MC Server 151, NOC Server 154, and GC Server 153 may be interconnected as shown in FIG. 1, with connectivity to the base station 130 via Ethernet or other wired or wireless networking configurations. Other configurations of these components, such as co-location in a common facility or distributed location of the various components is also contemplates. MC 151 may be housed in or connected to a Media Center facility configured to allow development, editing, encryption and/or other processing to facilitate data provisioning to the aircraft.

The GS 100 system may further include a management console (not shown), where the management console comprises one or more hardware and/or software modules, including elements such as a graphical user interface (GUI), to allow GS 100 system administrators to configure the GS 100 system and/or individual components (such as groups, aircraft, rules, roles, priorities, content, and the like. This functionality may be incorporated in NOC Server 154, GC Server 153, and/or in other computer systems or servers in GS 100.

Figure 10:
FIG. 10 illustrates a screen show view showing content assigned to the aircraft(s)

Example screen shots of embodiments of management console display screens and associated functionality are further illustrated in FIG. 8, as well as FIGS. 9 and 10. As noted above, in some embodiments, the management console may reside in whole or in part on computer 153, however, in some embodiments the functionality associated with the management console may be distributed over other system components, such as other server components as shown in FIG. 1 or on other networked computer systems (not shown).

MC 151, GC 153 and NOC Server 154 may be linked via the Internet or via other types of wired or wireless connectivity to multiple RC 220s and base stations 130.

Typical aircraft 112 include an inflight entertainment (IFE) system. The GS 100 is configured to manage a database of inflight entertainment (IFE) content (also denoted herein as an IFE database) coupled with an associated schedule of aircraft types and location timetables. The IFE content may include data, text, digital audio or video content, multimedia content, electronic games or other interactive content, or other types of content for inflight use or entertainment, with the IFE database including information about the corresponding IFE content associated with particular aircraft or flight. The IFE database may also define a media-update schedule for all subscriber aircraft 112. A separate transport layer may be configured to be responsible for moving large digital media files to local storage at each airport site for storage and upload to particular aircraft 112.

The GS 100 may also be configured to manage the preparation (licensing, editing, packaging, & encoding) of airline data, audio, video, print, multimedia and gaming content. Media packages prepared as dictated by the system are transported around the globe to regional content servers 170 in RC 220s associated with particular airports or regions, for secure delivery to each individual aircraft 112 via a corresponding local controller (i.e., LC 145). All media packages are typically identified in a manner whereby they can only be downloaded and decrypted based upon unique aircraft LC 145 identification.

Figure 2:
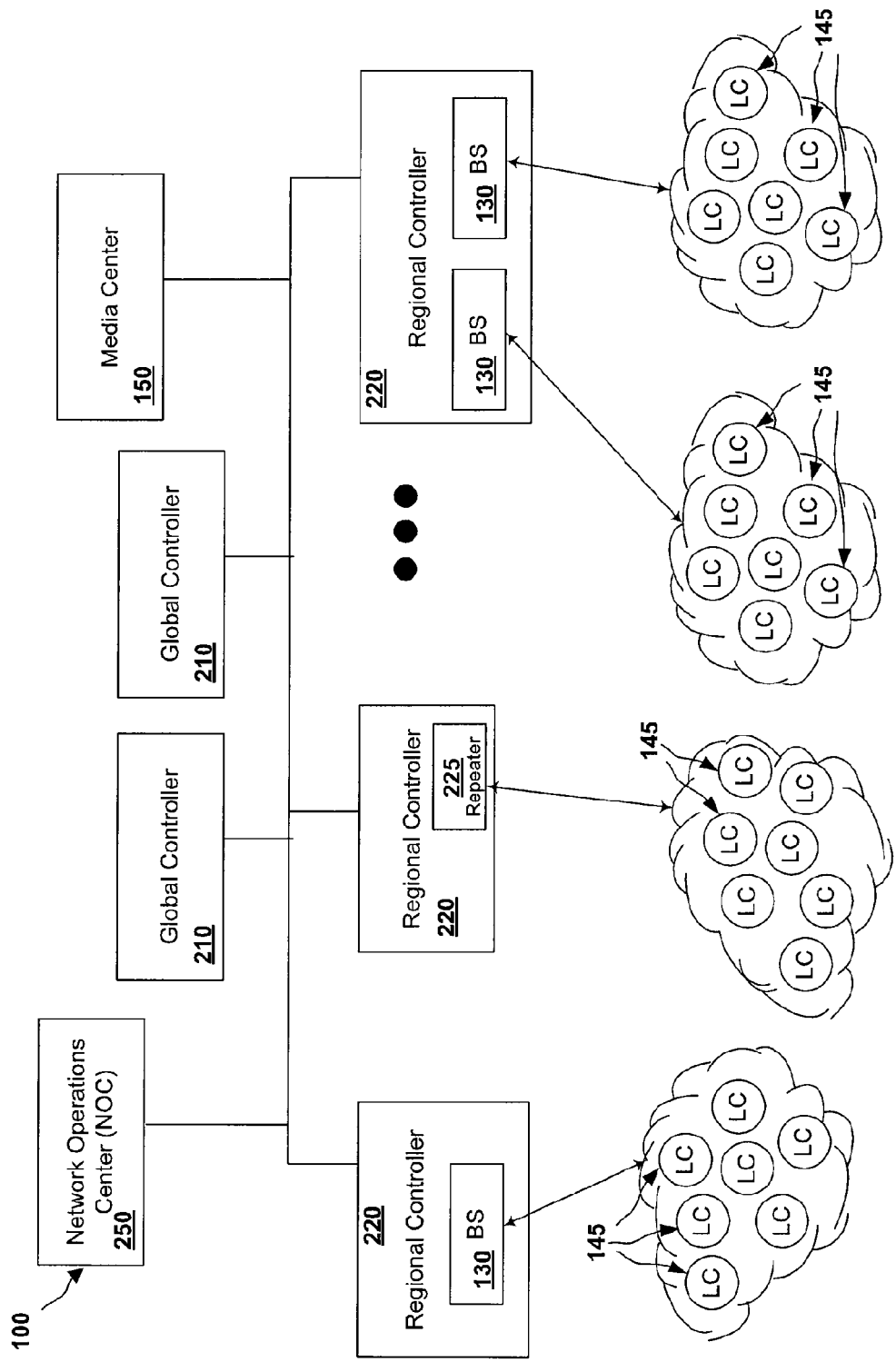
FIG. 2 illustrates one embodiment of a GS hierarchical and distributed architecture, in accordance with aspects of the present invention.

Attention is now directed to FIG. 2 which illustrates additional details of a GS 100 system architecture. The GS 100 may be built using hierarchical and distributed architecture that consists of multiple Global Controllers (GC) 210, Regional Controllers (RC) 220 and Local Controller(s) (LC) 145, as illustrated in FIG. 2. In addition, one or more Network Operations Centers (NOC) 260 may be coupled to the GS 100 system, as well as one or more Media Centers 250, which include one or more MC servers 150.

The NOC 260 includes one or more centrally located servers for consolidated support of the entire system. This is typically for primarily technical purposes, but may also be used to provide visibility and management access to content transfer functions. Server 153 as shown in FIG. 1 may be located in the NOC 260 to provide this functionality.

There will typically be multiple sources of content for provisioning. For example, there may be one set of content for each airline customer, and potentially one or more for content generators in the Media Center(s) (MC) 260 who prepare encrypted and/or edited content for each airline. The MC 260 may also have portals for the airlines to manage the content. In addition, there will typically be multiple Global Controllers (GCs) 210, which are typically associated with a particular airline or airport. In a typical embodiment, metadata associated with the content will be forwarded to each RC 220 from the MC 150s, GC 210s or the NOC 260, and the RC 220 will fetch associated the content from the MC 150 or GC 210. The NOC 260 will check to make sure the relevant metadata is present, with the RC 220 typically not caring where the data or content comes from as long as it has the appropriate content and metadata needed to describe deployment criteria.

As noted previously, in a typical embodiment, MC 250 constitutes a separate facility, where personnel edit films or other content for airlines in conjunction with computer systems/servers, then encrypt the content and include a user interface for airlines to schedule deployment of the films or other content to various flights. The data associated with the films or other content is denoted as metadata, with the film or other media denoted as content. This service will typically be done by a third party. A global controller, such as GC 210, may be an alternate source of content and metadata. Typically the GC 210 will contain airline uploaded content, such as daily news, passenger manifest information, or other content, along with metadata describing priorities and targeted aircraft for deployment. In addition, a GC 210 may supplement or override metadata associated with content from the MC 150. The GC 210 will typically be associated with an airline, or in some cases an airport. The content and metadata from both the MC 150 and GC 210 will typically be found on multiple RC 220s for distribution to multiple LC 145s.

In a typical embodiment each RC 220 is located at or in the proximity of an airport, with the RCs typically including one or more servers as shown in FIG. 1, one or more sector controllers 140, one or more base stations 130, as well as, optionally one or more repeaters 125. As described previously with respect to FIG. 1, LC 145s are aircraft onboard systems providing aircraft system interfaces, communications links, security, and store and forward capabilities to provide connectivity with the RC 220s through the BS 130s.

The NOC 260 is typically run by a system operator, which could be an operator such as the company Proximetry, Inc., assignee of the present application, a customer or customers, a joint venture providing services to the airlines (or potentially to airports who resell the service to airlines), or another operator. The NOC 260 is connected to other system elements, such as the RC 220s, via Internet or other networking connectivity. The NOC 260 is configured to monitor the entire network, including the status of all fixed network devices (RCs), onboard aircraft devices (LCs), and the aircraft IFEs that the LCs connect with. Software to monitor network health and proper network optimization is associated with alarms and tools for ad hoc debugging and remote investigation of problem areas.

A typical GC 210 is configured to manage media distribution for the entire global enterprise (for example, global content delivery to a specific airline operator such as United Airlines or American Airlines), where the global enterprise typically consists of multiple aircraft 112 distributed over large geographical areas such as the entire globe, or on multiple continents, countries or states. A group of aircraft 112 form regional communities for media exchanges. Each regional community is then controlled by an RC 220 in coordination with the GC 210 and LCs 145 onboard aircraft 112. A particular aircraft 112 may join any regional community for participation. However, an aircraft 112 is typically an active participant of only one regional community at a time, as physically present at a regional airport or other regional facility.

Figure 3:
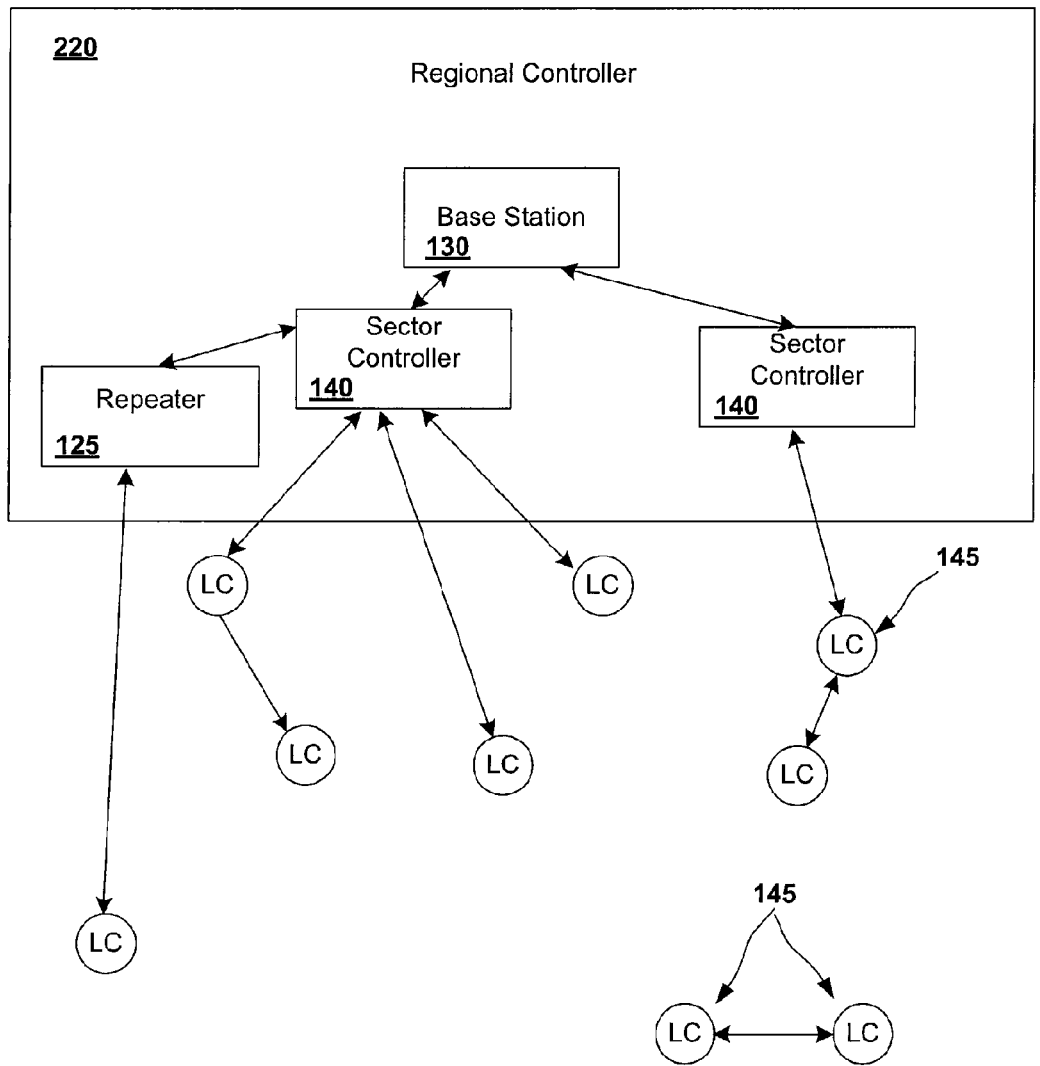
FIG. 3 illustrates an example of node connectivity and topology of a regional community, in accordance with aspects of the present invention.

In a typical embodiment, the base station 130 may reside on airport or off-airport within a certain maximum distance (e.g., for example, within 3 mile radius depending on geography, etc.), with antennas mounted on nearby elevated infrastructures. Both licensed and license exempt wireless frequencies may be employed. The RC 220 manages media distribution of the regional community of aircraft. Aircraft 112 are typically distributed over an airport's geographical area, and located/positioned at different distances to and from a BS 130. Such a configuration may be represented in a form of the graph, which consists of nodes interconnected by links, as illustrated in FIG. 3. A node (i.e., LC 145) can be connected to a central point (i.e., BS 130) directly or via one or more multi-hop nodes, such as through a repeater 125 or another LC 145. In addition, aircraft 112 can be connected to other aircraft 112 through one or more corresponding LC 145s to form peer-to-peer and mesh configurations. Examples of these various configurations are illustrated in FIG. 3. Other configurations (not shown) may also be done, such as LC 145s connecting through a repeater 125, multiple LC 145s communicating in a multi-hop or mesh configuration, or other configurations such as are known or developed in the art.

One potential advantage of a system implemented in this fashion is the alignment of optimization strategies on multiple layers of the network. Various optimization goals may require coordinated policy changes on PHY, MAC and IP layers of the delivery system, as well as application linked strategies regarding which media to transfer at which time with unicast or multicast protocols. THE RC 220 may be configured to dynamically employ multiple routing and media delivery strategies based upon one or more of the following criteria and objectives: Lowest cost; Highest data throughput available; Shortest time available; Highest priority; Maximum number of aircraft to serve; Minimal latency to streaming live applications; or other criteria.

An LC 145 is typically configured to manage media distribution for a single connected aircraft 112. This includes receiving and storing media content and content needs of its particular aircraft 112, as well as collecting, receiving, storing and/or transmitting other data or information, such as flight information, passenger manifests, aircraft condition information and the like. Each LC 145 may also be configured to communicate with its neighboring LC 145s to be aware of its neighbors, and store data or content from other aircraft as well as information about the quality of communication links between them. In addition, an LC 145 present on one aircraft 112 may communicate with an LC 145 present on another aircraft 112 on a peer-to-peer basis. Such communication may be controlled by an associated RC 220 if such a communication link is established between the various nodes, or can be established and conducted without the presence of an RC 220 if no RC 220 is present, or if there is no communication link to/from an RC 220. LC 145s can communicate with an RC 220 BS 130 directly, through a repeater 125, and/or through another LS 145 in a mesh relay mode. LC 145s may also communicate directly with other LC 145s in a peer to peer mode (and/or multiple aircraft if operating in a "super-Peer" mode where one LC 145s is configured similar to an RC 220).

Exchanges performed in the absence of an RC 220 may occur in a number of ways. For example, in a simple form a "mailbox" server implementation may be used, where the RC 220 does not have the high speed Internet connectivity to pull down the content, but does have the wireless infrastructure to connect to the aircraft 112. In this implementation, an aircraft 112, upon landing, will have its LC 145 upload its latest content to an "unconnected RC 220," where the content is cached for another aircraft 112 needing the same content. In a similar fashion, another LC 145 associated with a different aircraft 112 will query the "unconnected RC 220" for any new or updated content it needs. In this implementation, the unconnected RC 220 functions as a mailbox to store and transmit content based on particular aircraft needs and connectivity availability.

In another implementation, where no RC 220 is available, the LC 145 may search for another LC 145 with which to exchange content. Mutual authentication and secure communication is typically used between the two (or more) LC 145s to securitize this peer-to-peer communication session. The GC 210 may pre-authorize such communications between LC 145s, based upon various parameters such as RC 220 knowledge of LC 245 content needs, content availability, connection schedule, location information, and/or other parameters. This knowledge may be acquired and updated with the assistance of GC 210. LC 145s may also provide a dialog or negotiation between themselves regarding content needs and content availability prior to content exchange. The LC 145s may also update a connected RC 220 on its communications with other LC 145s to ensure that both RC 220 and GC 210 have information regarding the current state of media distribution.

In some embodiments, an RC 220 can learn about LC 145s that are not in its communication range by requesting a neighbor report from connected LC 145s. This report may include a list of all LC 145s that are in the range of the requested LC 145. Neighbor reports may also include other information such LC 145 status, media content available and/or required, or other information. Neighbor LC 145s may also provide their neighbor reports to a connected LC 145 for transfer of these reports to an RC 220. Based upon this available information RC 220 may instruct and authorize LC 145 to conduct peer-to-peer, mesh or relay communications.

In the event that there is no RC 220 and no base station 230, the LC 145 may use an alternative radio link configured to connect to carrier or private network frequencies (such as CDMA, GSM, or LTE) to register connectivity and provide information to or from the NOC, identify its location and permissible frequencies and protocols for use, and identify peer to peer partners at the same airport. In addition this connectivity may be used to draw appropriate content from the NOC 260 for the bandwidth available—for example EVDO (Evolution-Data Optimized or Evolution Data Only is a telecommunication standard defined by the third generation partnership project (3GPP2) as part of the CDMA2000 family of standards, and has been adopted by many mobile phone service providers around the world to support high data rates to be deployed alongside a wireless carrier's voice services) or GSM could deliver manifests, while LTE (Long Term Evolution, which is a 4G standard defined also defined by 3GPP2) could deliver content. Once peer-to-peer partners are identified, along with permitted radio permutations, the system will start up the determined radio interfaces and initiate peer-to-peer connections.

Peer-to-peer connectivity can be achieved using a configurable multiple radio LC 145, controlled by intelligent software, with updated data on location. For example, in one embodiment the LS 145 receives/downloads information from GSM, avionics, GPS, IFE or other position determination devices and then uses that information to determine appropriate/allowable radio communication channels (i.e., frequencies and protocols). The LS 145 may first listen for an RC 220 and if no RC 220 is present, the LS 145 may then listen for another LS 145 operating in a "beacon" or "superPeer" mode, which functions similar to an RC 220. For example, a previously arrived aircraft may operate in the most after having determined that no RC 220 or other LS 145 is present. If the newly arrived aircraft detects the superPeer, it may then establish communication and exchange any desired media content or data with the other aircraft. Conversely, if the newly arrived aircraft does not detect another RC 220 or LS 145 operating in superPeer mode, it may then re-initialize and operate in superPeer mode to detect later arriving aircraft. Software modules contained in the LS 145s may be configured to implement this functionality, including determination of location, selection of appropriate radio frequencies/channels, communication and networking protocols, modes of operation (i.e. BS or subscriber station), credentials needed to establish a session, as well as other parameters.

In some embodiments, if the connection is deter-mined to be peer-to-peer the system may reboot in special configurations—for example a WiMAX cpe that is part of the PC may be reconfigured to act as a picoBaseStation, or a combination of radios may act as a relay, utilizing multiple protocols and frequencies. In addition in a peer to peer mode there will be lightweight content transfer control software present to determine which files should be transferred to which device.

The above network topology options, combined with multiple modes of communications, enable creating parallel media distribution and cross loading capabilities that acts as space divided multiple subnetworks reusing scare radio resources, such as frequency and bandwidth, while maximizing link margins, thus increasing the speed of data transfers. This parallelization can be seen as separating the media distribution algorithm into a number of local algorithms operating concurrently at different transmitter-receiver pairs.

In addition, in typical embodiments the RC 220, which includes base station(s) 130, management servers 155, 160 and 162, and other infrastructure elements such as are shown in FIG. 1, manages its regional operations and its wireless network around the airport location, and dynamically adjusts the service levels associated with each content type depending on parameters such as the aircraft 112 departure date/time and current throughput. The RC 220 may also be configured to manage the onboard aircraft LC 145 software/firmware, including updates and changes, and wireless network and link parameters to optimize data transfers under a range of settings. In addition, the RC 220 may also manage the transfer of content to the LC 145s in accordance with metadata associated with content packages according to grouping information derived from the MC/GC server(s). The RC 220 may also be configured to validate download events and allocate priorities dynamically according to defined profiles. As used herein, profiles are network optimization configurations for example, most bytes transferred, best coverage to all devices, timing priorities, etc. Typically not all content is given the same value/priority, and not all aircraft are similarly characterized. Therefore, a matrix of priorities based on media content such as daily news vs. digital movie for flight departing in 3 minutes vs. 2 hours is developed. In addition, live debug sessions and service flows such as VoIP and video may be done, such as when an aircraft lands and requires service, maintenance, testing, etc. In addition, these priorities may be modified based upon wireless network and link performance to each aircraft 112 and to date/time for flight departure.

In some embodiments, another application supported by GS 100 is the ability to create secure sessions with associated service flows to both the LC 145 and IFE. This connectivity is directed at solutions for two scenarios: the first is maintenance and troubleshooting of the equipment, and the second is supporting live feeds for on aircraft devices and crew members. In the maintenance and troubleshooting mode live statistics relating to content transfer, connectivity, and device health are sent back to the NOC for monitoring purposes. In the event that these statistics trigger further investigation secure network sessions are created for remote users to log in and run diagnostics, configuration scripts, and restart interfaces and devices. This will depend on the device interface. Most devices will have SSH and telnet interfaces, and some may have more advanced tools. With IFEs, a reverse SSH session may be initiated by the IFE from behind its firewall based on the IFE polling its associated LC 145 for a flag on "start debug session" and a parameter of the NOC IP requesting the session. For the LC 145, a simpler situation would be the NOC 260 directing initiation of an SSH session with credentials.

In addition there is the provision to support the use case of crew members wishing to use the network link for applications rather than simply content transfer, including latency sensitive application such as voice and video. Aircraft maintenance, cabin preparation, and passenger loading are among the activities we have been requested to support with streaming and other real-time applications. These streams may be identified by protocol sniffing or IP:Port profiling, and QOS levels may be applied to predefined services designed for these applications.

The integration of GC 210 and RC 220 functionality sets makes the combination a unique and powerful tool for wireless delivery of critical information and content in tight windows of data transfer opportunities (the so called "wheels down window"). This window of time may be very limited for many commercial aircraft due to the desire to keep aircraft in the air to maximize revenue. For many commercial airlines, airplanes need to be quickly unloaded, cleaned (if applicable), refueled and reprovisioned, and then reloaded for departure. In many cases this time window is very short, requiring that systems in accordance with the present invention be capable of quickly determining aircraft needs and providing the associated content.

Another aspect of the present invention relates to an RC 220 management system, which includes a wireless network management software utility that fully integrates provisioning (content assignments), device management (content distributions) and resource management (wireless network and links performance optimizations). Details of embodiments of this wireless network management system and software are described in U.S. Utility patent application Ser. No. 11/754,066, entitled SYSTEMS AND METHODS FOR WIRELESS RESOURCE MANAGEMENT, U.S. Utility patent application Ser. No. 11/754,083, entitled SYSTEMS AND METHODS FOR WIRELESS RESOURCE MANAGEMENT WITH MULTI-PROTOCOL MANAGEMENT, and to U.S. Utility patent application Ser. No. 11/754,093, entitled SYSTEMS AND METHODS FOR WIRELESS RESOURCE MANAGEMENT WITH QUALITY OF SERVICE (QOS) MANAGEMENT. The content of each of these applications is hereby incorporated by reference herein in its entirety for all purposes.

The provisioning systems and methods described in these related patent applications allows users to create a set of service levels and rules that apply these to users, applications and data streams. Depending on the business process requirements, service levels can be associated with airline company requirements, and each individual department's (entertainments, safety, maintenance, etc.), data types (video, telemetry, etc.), devices (aircraft IFE, aircraft Flight Deck, other navigation, maintenance, avionics and mobile systems connected with aircraft or the maintenance and servicing of aircraft, commerce, operations, etc.), or applications (VoIP, e-commerce, etc.) residing on devices or any combination thereof.

A Device Manager (DM) application is configured to provide the ability to manage the images, i.e., software/firmware on particular devices in the network, and configurations of supported devices. It also provides a "back door" by which the device may be remotely controlled at the NOC 260 or controlled locally for purposes of maintenance and monitoring. Its role is the maintenance of image stability, including patches, updates and network rules, as well as the ability to dynamically change device parameters as dictated by a Resource Manager (RM) application. The DM also manages the content delivery to devices and a group of devices. The DM application is typically run on a server such as DM server 158, shown in FIG. 1, to maintain configuration and device inventories on the server. In an exemplary embodiment it uses a AirSync agent (i.e., a local device agent application/module) residing on the various devices to perform a proxy operation. A secure communication channel and protocol between the DM server 158 and AirSync agents executing on the various devices, such as LC 145s, is typically provided.

A Resource Manager (RM) application is an engine that monitors network conditions and invokes the service level rules established in the provisioning module to dynamically configure managed wireless network devices in real-time. This control includes traffic shaping and wireless network and links parameters on wireless network devices such as base stations 130, LC 145s and other devices, such as IFEs, using the network. The Resource Manager constantly monitors the network anticipating the need to change network configurations to ensure the service levels mandated by the provisioning requirements are met, and RC 220 optimization goals are met. An RM application may be configured in a fashion similar to a DM as described above, and may reside on an RM server, such as server 162 as shown in FIG. 1. RM processing modules may reside on the RM server and may be downloaded to devices, such as LC 145s, using DM communication, for local execution on the particular device.

Using these applications in a GS 100 system provides an intelligent, rules-driven foundation which device management and resource management modules leverage to provide higher throughput and predictable service levels. With this foundation, the GS 100 system manipulates and manages users, accounts, applications, application rules, and devices within a context and priority based environment.

Figure 4:
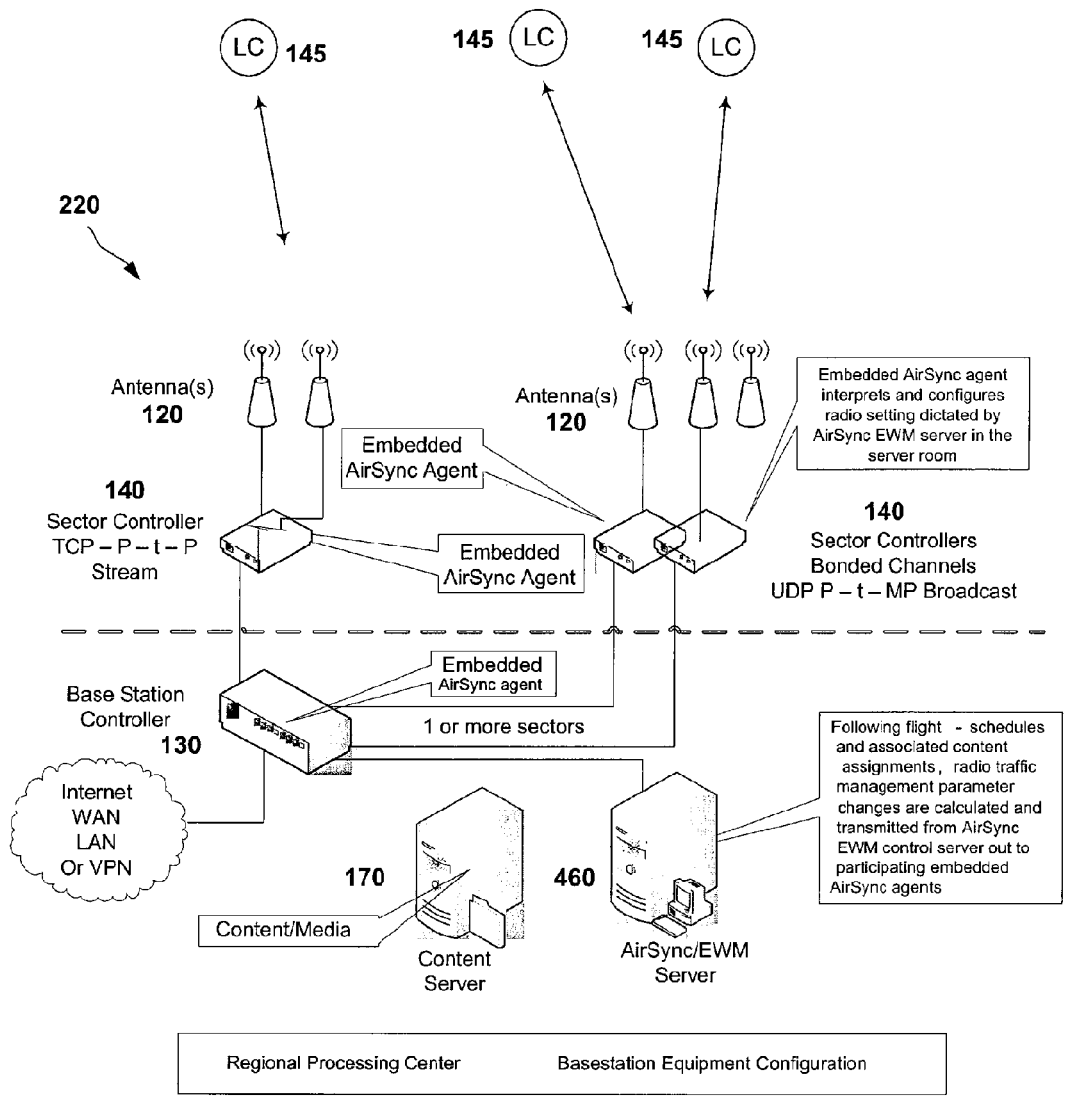
FIG. 4 illustrates one embodiment of a Regional Controller (RC) implementation.

Attention is now directed to FIG. 4 which illustrates an exemplary implementation of an RC 220. The RC 220 wireless network infrastructure may include one or more base stations 130, sector controllers 140, and sector antennas 120. The RC 220 may also include one or more servers as shown in FIG. 1, including content server 170, DM, RM, and provisioning servers 158, 162, 160, and or other servers, such as the AirSync server 460 shown in FIG. 4, which may be the same as or coupled to server 150 as shown in FIG. 1. Base station 130 and/or associated servers may include an embedded software agent, denoted herein as an "AirSync agent" based on a specific implementation of such an agent offered by Proximetry, Inc., which operates in conjunction with the AirSync server 460 as shown in FIG. 4 and/or Provisioning Server 160 as shown in FIG. 1.

In an typical application, when an aircraft 112 touches down and comes into range of RC 220 wireless connectivity, the base station 130 detects the aircraft, such as by having the LC 145 activate an appropriate radio channel and present its credentials to the BS 130, and then prompts the DM application to check that aircraft's content needs against metadata derived from the MC 150 or GC 210. As noted previously, there may be more than one Media Center and/or Global Controller associated with the system—and typically it will not be just a single facility. Web services associates MCs with the NOC 260 (such as by passing metadata including a pointer to content data) and the NOC 260 forwards this metadata (via web services in an xml format) to the RC 220. The RC 220 typically includes a content server which downloads the content associated with the metadata from the MC 150. Metadata is originally associated with content by the MC 250 or GC 210, either through a scripting process or UI when content is uploaded. The GC 210 may modify metadata or generate content and metadata on its own—which is then sent to the NOC 260 and processed as described above.

The MC 250 is typically associated with a service provider for content, with the GC 210 typically controlled by an airline that designates which content goes where and adds perishable content (e.g. local news updates) or local/unique content (e.g. passenger manifest).

Assigned streams of content are then directed to the aircraft 112's onboard LC 145. Transferred content is typically stored on a hard drive in the LC 145, to be uploaded to the aircraft's IFE system later, such as during taxiing or take-off. The AirSync server, (i.e. Server 160) is configured to manage service flows from the wireless network used to transfer content from the BS 130 in RC 220 to the LC 145s. Streams are managed according to priorities assigned in metadata and triggers based on network state and external events such as gate and equipment changes, departure times, and the like.

Figure 5:
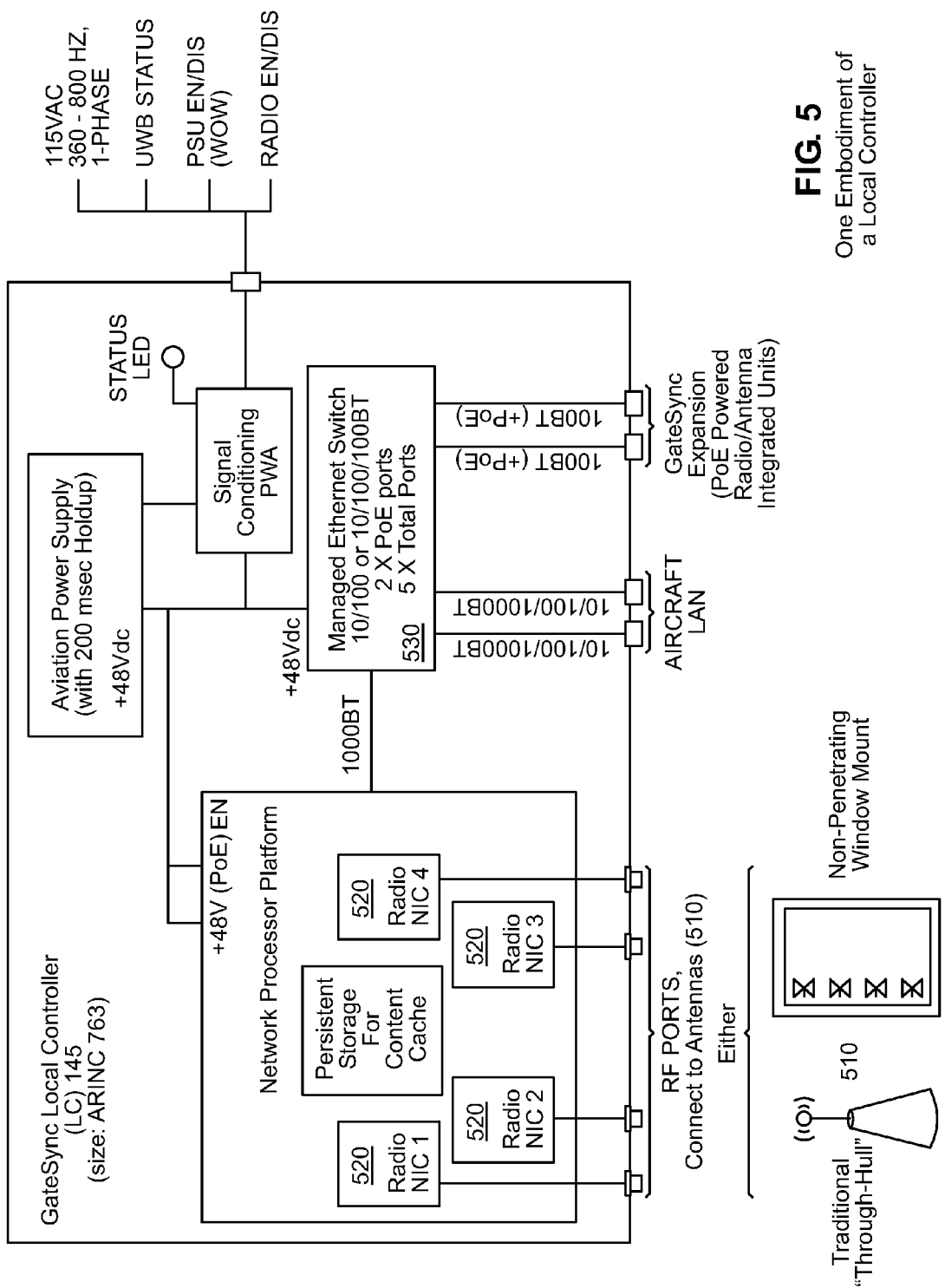
FIG. 5 illustrates one embodiment of a Local Controller (LC) implementation.

Attention is now directed to FIG. 5 which illustrates an exemplary implementation of a local controller (LC) 145. As noted previously, an LC 145 may include one or more antennas 510, typically window mounted paddle antennas or other antennas configured for use on aircraft, with each LC 145 including an embedded AirSync agent configured to interpret and execute local radio parameter settings dictated by an EWM/AirSync server 460 and/or 160 as shown in FIG. 4, through a base station 130.

A typical LC 145 includes one or more, typically several, radio units with interfaces that can be managed by embedded software running locally. These are systems configured with the ability to select appropriate interface (protocol and frequency) and mode (for example WiMAX pBS vs. SS mode) on start up, and capable of adapting to frequency requirements and to better wireless channels to optimize around areas of interference and low received signals. The radio components and the entire LC are typically onboard aircraft equipment and managed and controlled by software including agents for the AirSync and GateSync functionality. In addition, they will typically be connected to on board systems to provide aircraft related information and/or other communication links.

Additional modes of operation are possible for the LC 145s. For example, by leveraging the fact that a typical onboard system includes dual radios with two or more antennas mounted on opposite sides of the aircraft, which allow for opportunistic use of mesh capabilities in the wireless network against two scenarios to increase throughput against poor line of sight or interference scenarios. In the first scenario, when an aircraft 112 is docked with poor angle of reception or in a building shadow, adjacent aircraft 112 can act as mesh "relay stations" to transmit live data streams to the target aircraft 112. In a second example, adjacent aircraft 112 can signal each other via LC 145 agents on board and transfer common content back and forth without requiring use of valuable base station 230 bandwidth. This type of operation enables the ability to overcome NON LOS (i.e. Line of Sight) communication or non-reliable paths, by employing LOS mesh communication paths to maximize data rates due to lower path loss (higher link margin) for these shorter peer-to-peer links.

Aircraft typically have software-controlled radio devices capable of adapting to frequency requirements and to better wireless channels to optimize around areas of interference and low received signals. These may be integral with our coupled with the LC 145s and may be used in conjunction with dynamic adaptations and advanced antenna systems (AAS), individual SLAs (i.e. Airline Service Level Agreements) to guarantee timely delivery of critical content to priority aircraft.

Software agents embedded on these LC devices may be used carry out local network configuration changes as dictated by the management server at the RC 220 location.

Figure 6:
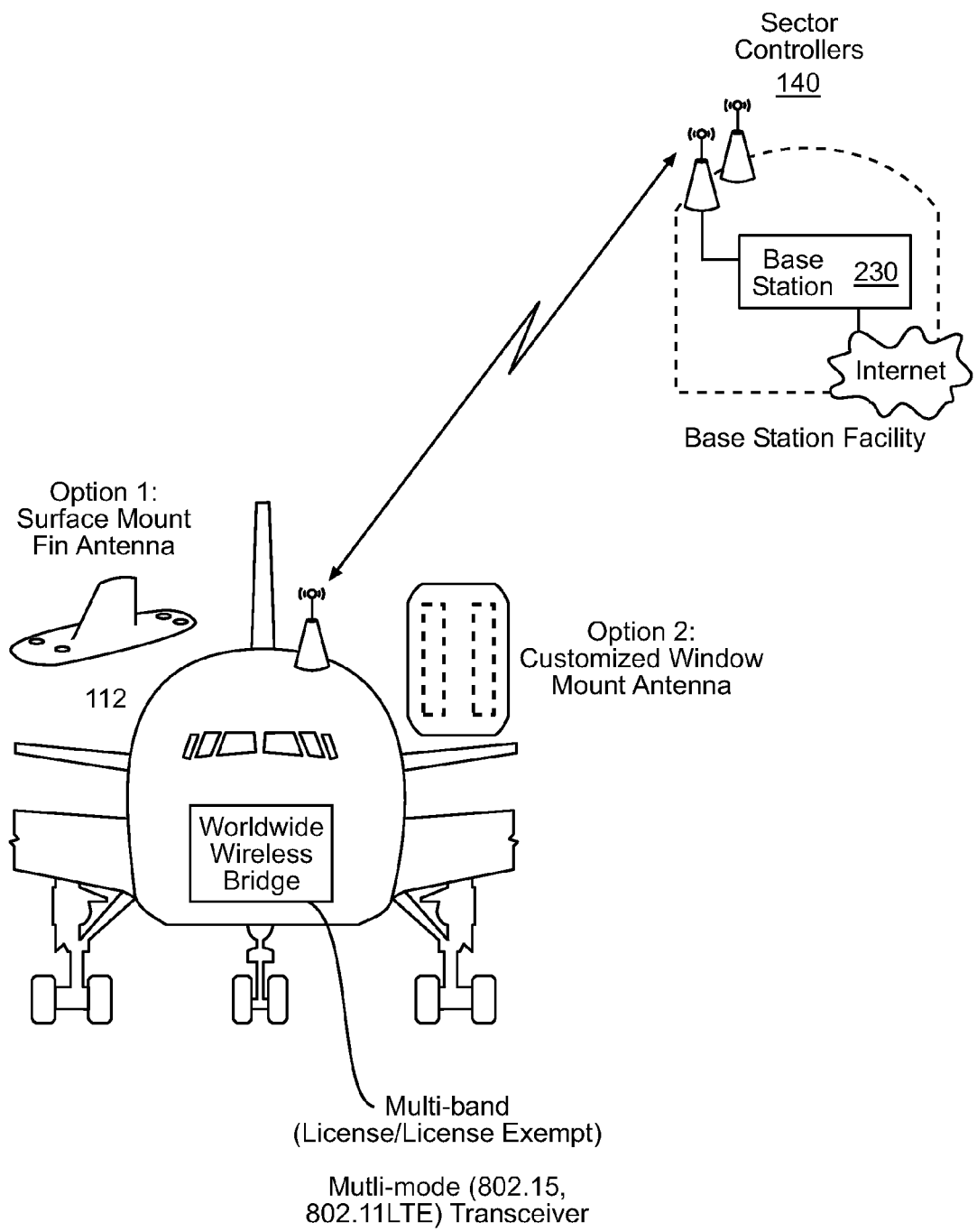
FIG. 6 illustrates an example of GS wireless networking and connectivity to an aircraft, in accordance with aspects of the present invention.

FIG. 6 shows an example of a GS 100 system providing wireless networking and connectivity to an aircraft 112. Communications may be provided through antennas known or developed for aircraft use, such as surface mount fin antennas, window mount antennas, or other types of antennas suitable for aircraft applications. Communications from a sector controller 140 are provided to the onboard LC 145, which in some embodiments may be a worldwide wireless bridge capable of acting as a transceiver for a range of communication protocols such as 802.16, 802.11, LTE, or others.

In a typical implementation, data content and multimedia information will be available to the GS 100 system for distribution to wireless nodes (i.e. aircraft via LC 145s). This content may include multiple multimedia files based on various types and sizes. Each file may have assigned source and destination addresses (Tx and Rx nodes) for delivery, delivery priorities, delivery start and expiration time, file type, information type, QOS requirements, and/or other characteristics and delivery requirements. Based upon this information and the file characteristics, the GS 100 system will prepare these files for optimal distribution over the wireless network, as illustrated on FIG. 6. For example, a GateSync Server (i.e. DM/GS 158) gets metadata from NOC 260, as forwarded from MC 150 and/or GC 210, and content from MC 250 and/or GC 210 is then transferred to the Content Server 170 for later upload to the aircraft. The preparation may include, "chunking" and indexing large files into manageable fragments that can be reassembled by the receiving nodes, which are typically done by the Content Server.

The GS 100 typically has global knowledge of all content that is available and that must be distributed to each individual user/device/node. This knowledge may be derived from metadata provided in conjunction with the content that the GS 100 system receives before it accepts content, such as from the MC 250 and/or GC 210. Likewise, Each RC 220 may have a local file server, such as content server 170, configured to store the received content and provide it for distribution. The stored content may include (but is not limited to):

From airline Media Center/GC: Groups, airline name, aircraft type, origin airport, destination airport, flight number, departure time (only for flight number group).

Devices: air planes/air plane tail FIN numbers.

LC Devices: Radios

Content packages: Movies and video files for IFE (In Flight Entertainment) system, Multimedia advertisements for IFE system, News, Flight Manifest, Operational data, Video for security, Telemetry for medical emergency, e-commerce data Service types: Broadcast, Multicast, Unicast, Rules, Arrival time, Departure time, Link performance, Number of connected aircraft, Download needs, Download status, Download complete, Exceptions The above information may be obtained, refreshed and synchronized with airline Media Center/GC 210.

Figure 7:
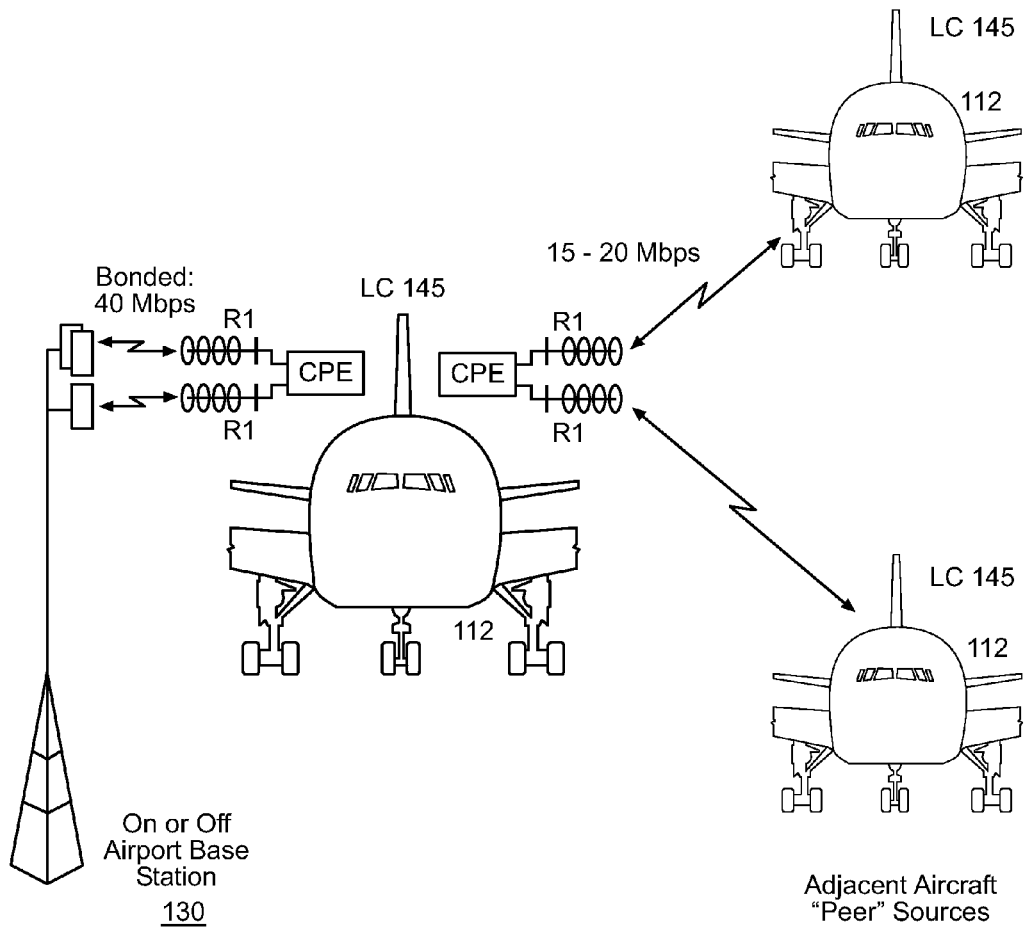
FIG. 7 illustrates one embodiment of a GS operational & peering scheme, in accordance with aspects of the present invention.

FIG. 7 illustrates aspects of one embodiment including peer to peer communication, where a first aircraft 112 receives content from a BS 130 via an LC 145, with the BS 130 located either off-site of the airport or on-site (not shown), and then provides specific tailored content to a second aircraft 112 in a peer-to-peer networking configuration.

FIGS. 8, 9 and 10 show screen shots that illustrate exemplary embodiments of some of the above information fields.

FIG. 8 illustrates a screen shot of an Aircraft View 800. Aircraft View 800 may be presented on a control/administration computer within the GS 100 system, such as computer 153 as shown in FIG. 1, or via NOC 260, MC 250 or GC 210 computer systems. This computer may comprise a management console as previously described with respect to FIG. 1, with a DM server used to keep track of groupings. In a typical embodiment, an aircraft is treated as a device, identified by a unique number, with unique Flight Information (FIN). A system administrator, such as a GS 100 system operator or an airline specific operator/user may use screen displays such as the display shown in FIG. 9 to define groupings based on airline operational plans.

Aircraft view 800 includes a group hierarchy 810, which may include an airline associated with the aircraft, the type of flight (i.e., regular, charter, etc.), the Origin airport, flight numbers, and/or other information about the aircraft 112 and its relationship to an associated airline and/or airports or other facilities. In addition, a unique identification number or other designator 820 may be provided, along with additional details 830 regarding the aircraft 112 and media to be uploaded to the aircraft 112 and/or other data.

Upon selecting additional details 830 as shown in FIG. 8, another screen may be presented, such as the one shown in FIG. 9, which illustrates an embodiment of an Aircraft Details View 900. This view may include various features, such as an aircraft sub-view 910, an aircraft rules sub-view 920, an aircraft packages sub-view 930, as well as other views (not shown). Aircraft sub-view 910 may include information related to the aircraft and associated airlines, flight numbers, departure or arrival cities, schedule information, group information and/or other information.

In an exemplary embodiment, a group is used as a container for both a single role and one or more aircraft. It thus serves as the connection mechanism for the modified service flow and the contextually defined status of the aircraft to dynamically assign and optimize a set of network resources and service rules to the aircraft.

In accordance with one embodiment, the following is a list of roles, and simplified examples of what type of data might be important.

Roles

Landing—This is the role the AirSync Client, residing on the aircraft's LC 145, will initially receive. The client will stay in this role until the GS 100 Server (i.e. Server 158) receives a notification from the Airline that the client has arrived at the gate. This role will have priorities adjusted so that information that needs to be sent immediately after touchdown will be send.

At Gate—This role will be assigned to the LC 145 (client) upon the GS 100 server receiving a notification that a client has arrived at a gate. This information may come from the GC 210, in conjunction with the respective airline(s) reporting system. In one embodiment, the information may be provided in a webservice message to the GS 158 server. The GS 158 server then instructs the AirSync (i.e., PS 160) server to change the role assigned to the target LC 145. This role change will then be changed to modify the priority for multimedia information such as news, movies, music, etc. (i.e., increase priority at the gate). Content type may include passenger manifest, news, movies, maintenance data, etc. the passenger manifest is a list of passengers with seat assignments, and may also include other passenger related information. Service flow is a connection (e.g., VoIP call, TCP connection, etc.) with assigned quality of service (QOS) parameters.

Departing—This role will be assigned to the LC 145 (client) upon the GS server receiving a notification that the client will be taking off in a particular time period (e.g., the next 10-20 minutes). Upon assignment the server will initiate transfer of passenger manifest information. For example, for an aircraft departing in X minutes, based on departure from gate time provided by the GC 158, the GS 100 system will automatically track time remaining to transfer content, and increase priority of critical untransferred content depending on content type and time to departure. The mechanism for these changes may be a webservices notification to the AirSync server to change the role assigned to the LC 145 to ensure completed transfer of essential content, for example, manifest and daily news would have priority over monthly update of digital movies as they are REQUIRED to take off.

Dept Ready—This role will be assigned upon the completion of the passenger manifest transfer. Passenger manifest transfers may occur several times during a gated period, and as they will typically be assigned a high priority, they may interrupt other content transfer activities. Once this transfer is completed, other lower priority transfers may then occur. FIG. 13 illustrates a set of roles and associated priority in accordance with one embodiment of the invention.

Aircraft rules sub-view 920 includes information related to rules for particular types of media content as well as prioritization of the delivery of the associated media content to the aircraft. For example, Application is a Media Type (i.e., video content, audio content), that has an assigned rule, such as, for example, an available bandwidth such as 1000-1500 Kbps, a priority (for example, high priority may be set at 1), and group objects linking it to a role (interface).

Aircraft packages sub-view 930 includes information regarding the inventory of content to be transferred. Illustrative content inventory is shown in FIG. 930, content type is passenger manifest, name is simply a tracking of passenger manifest for the designated flight, and service flow is data transfer (P2P) as opposed to broadcast or latency sensitive streaming flows such as VoIP.

FIG. 10 illustrates an embodiment of an Aircraft Content Assignment display, showing packages of content 1010 to be assigned to a particular aircraft 112 upon arrival at an airport or other facility. This display may be provided through the provisioning implemented in the media control center 150. For example, it may represent a list of available packages (software/content for uploads). A system administrator will typically assign packages to groups/aircraft in conjunction with the media control center 150 as described with respect to FIG. 1. FIG. 14 shows an embodiment of a content selection view 1400 illustrating available and assigned advertising items.

Content types will typically use one or more service flows, dependent on network conditions and aircraft status. Table 1 below illustrates a mapping representation of content to service flow status given a range of mapping options. Typically a combination of GS 100 system servers (such as, for example the GateSync server 158, Content Server 170, and AirSync Server 160) will select and send content leveraging different services depending on parameters such as aircraft priority, content downloaded, modulation to members of potential multicast groups, missing chunks in multicast content as well as total load on the wireless system.

TABLE 1

Content and Associated Service Type

| Content | Service Types |
|---|---|
| Feature Films | Feature Film, Multicast, Multicast Priority, Feature Films Priority |
| Advertisements | Advertisement, Advertisement Priority, Multicast, Current |
| Current Content | Content, Current Content Priority |
| Flight Data, Uploads | Flight Data, Flight Data Priority |
| Flight Data, Downloads | Flight Data, Flight Data Priority |
| LiveLink (VoIP) | Handheld VoIP |

Communication between nodes can be constrained by certain policies, rules, priorities, time limits and performance requirements, and these can vary from node to node. These policies, rules, priorities, etc. are typically assigned by role. These constrains are taken for consideration by algorithms optimizing system and specific link or node performance. The GS may use variety of algorithms designed to meet specific performance or optimization goal or multiple goals for each or set of nodes. These algorithms are launched as required to meet a specific optimization goal. For example, major optimization goals and associated constraints include providing content in a specific time and insuring communication link available. For example, one constraint is to determine the required capacity to upload content to an aircraft during downtime (i.e. time between arrival and departure) based on the required content to be uploaded and system capacity and configuration. In some cases there may be exception events that would require dynamic reconfiguration, such as when an aircraft arrives late and/or must depart early or in less than the expected downtime. In addition, content delivery criteria may change requiring uploading or more and/or different content prior to departure. The GS 100 system is configured to process various conditions such as these and dynamically adjust content delivery in response.

For example, one significant constraint is time limits/deadlines for communication link availability, such as landing to departure time. Processing to address these constraints may be done by the RM running application/module running on the RM server.

In typical embodiments, the computations take into account only devices that are connected to particular base station at a time. This is typically done by an RM module/application running on the RM Server, such as server 162 shown in FIG. 1, and adjustments are activated based on occurrence of conditions requiring content delivery update. This is typically provided by a content provisioning server, such as server 160 as shown in FIG. 1. In a typical embodiment, only rules that are assigned to the currently connected aircraft are taken into account, with activation occurring when specific conditions, such as aircraft delays or arrival/departure changes, happen. Activation may be done in conjunction with a provisioning server, such as PS 160 as shown in FIG. 1.

For example, in one embodiment, when an airplane 112 arrives and connects to an RC 220, the RC 220 retrieves current roles defining service flows, priorities and device characteristics for the particular LC 145 and utilizes roles for all connected airplanes definitions for all connected airplanes 112, including the newly detected one, to perform calculations and optimizations. In addition, time triggers that check the time of departure for a particular airplane 112, and other conditions or exceptions such as change of equipment (i.e., aircraft, failure of content file transfer based on an ECC check, or other unexpected conditions that may invoke recalculation of rules for a particular RC 220 or BS 130.

Wireless technologies such as IEEE 802.16 may be used to employ adaptive modulation techniques and data transfer rates in accordance to available link performance margin (SNIR). Link margins are affected by the distance between transmitter and receiver, transmit power, by signal to noise ratios and interference, in addition to other factors affective RF signal propagation. Line-of-sight (LOS) and No-Line-of-Sight (NLOS) signal propagation will also affect link and system performance, with LOS links typically delivering higher link margin/performance. More efficient modulation and coding techniques may be used for higher link margin, resulting in higher data transmission rate and data throughput. Table 2 below illustrates a mapping of signal strength, as may be determined by local components such as LC 145s, sector controllers 140 and/or base stations 125, mapped to corresponding modulation techniques and associated data rates. For example, if the GS 100 system determines that the received signal strength on a particular wireless link between an LC 145 and BS 125 is −68 dBm or better, 64QAM-3/4 modulation may be selected and used to support a 54 Mbps data rate. Conditions such as those shown in Table 2 may be continuously monitored, with the associated modulation (or other parameters, such as signal power, etc.) updated to provide a particular desired performance.

TABLE 2

Modulation and Associated Data Rate as a Function of Signal Strength

| Received Signal Strength | Modulation | Max Data Rate |
| --- | --- | --- |
| −68 dBm | 64QAM-3/4 | 54 Mbps |
| −69 dBm | 64QAM-2/3 | 48 Mbps |
| −74 dBm | 64QAM-3/4 | 36 Mbps |
| −76 dBm | 64QAM-1/2 | 24 Mbps |

Consequently, in a typical implementation each link can be characterized by a set of performance characteristics that may include parameters such as SNIR (signal to noise/interference ratio), and QOS profile (data rate, delay, etc.). Typically, nodes closer to a BS 230 will exhibit better link performance, because more efficient coding/modulation scheme can be used for links with higher link margin (i.e., SNIR).

Network topologies and modes of communications such as those described above allow creating efficient media delivery networks with maximized data rates, due to selection of the best performing links, and by "converting" NLOS links to LOS, when utilizing peer-to-peer and mesh configurations.

In accordance with some embodiments of the present invention, implementation of an RC 220 may employ OFDMA and antenna systems based on the IEEE 802.16 standard, incorporated by reference herein. If single-hop communications are used, BS 230 associated with the RC 230 is configured to control TX power and time/frequency scheduling in OFDMA-based wireless networks with point-to-multi-point architectures (single-hop communication). BS 230 acquires and stores, through, for example, radio channel feedback which is stored on the RM server 162 and/or an associated database, channel knowledge of each node, such as channel knowledge regarding each connection between LC 145s and other LC 145s, repeaters 125 and/or base stations 125. Based upon this information, BS 230 assigns time slots and sub-carriers (chunks) to each subscriber together with proper modulation/coding rates that result from a dynamically determined power allocation strategy. The objective of the algorithm is to maximize either some aggregate utility of rates or, more generally, the sum of appropriate utility-per-cost measures subject to given QoS constraints such as delay and rate constraints.

The consideration of utility-per-cost measures may be reasonable in cases when the throughput performance should be balanced against the power or energy consumption. As described above, provided media typically includes different file/traffic types, with different QoS and priority requirements. Traffic may include real-time and non-real time traffic with hard rate requirements as well as best effort traffic. The MAC protocols dynamically adapt to varying channel and network parameters. For example, MAC (Media Access Control) is an OSI layer 2 protocol. The MAC protocol "grants" media access to the specific radio media (i.e. LC 145s, repeaters 125, etc.), with the MAC choosing or adapting to the particular modulation scheme being used, such as those described previously with respect to Table 2. This may further be based on knowledge of the channel (RSSI, interference, etc.). Dynamic adaptation can be done in various ways. For example, in one embodiment, a "thresholding" approach may be used, wherein the RSSI threshold is used to determine which MAC to use, with the radios then instructed to change modulation, etc. The MAC can also be used to instruct transmitter elements of the various radios to use more power to increase signal strength (and RSSI) to facilitate better modulation methods, thus allowing higher data rates (such as is as shown in Table 2). In addition, in a typical embodiment a BS 230 is not restricted to allocate a block of consecutive sub-carriers. For example, a BS 230 may allocate different modulation/coding rates per chunk and/or per node, based on system requirements.

In some embodiments, aspects of implementation details described in PCT Patent Application Serial No. PCT/DE2006/001653, entitled SIGNALING METHOD FOR THE DECENTRALIZED ALLOCATION OF ONLINE TRANSMISSION POWER IN A WIRELESS NETWORK, filed on Sep. 18, 2006, may be used. This PCT Application is hereby incorporated by reference herein in its entirety.

In embodiments using centralized multi-hop communications, BS(s) 230 associated with an RC 220 may control power and scheduling managed by the BS 230s for a number of involved hops. This may be implemented by, for example, providing a control signal from the RM server 162 to the MAC to configure particular radios.

In embodiments using distributed multi-hop and mesh implementations, such as load balancing implementations, BS(s) 130 associated with an RC 220 jointly controlling and manage wireless network resources. Such control may be based on distributed algorithms. These algorithms may include the differentiation among traffic types as well as to efficient utilization of buffer and power resources of relaying nodes. The concept of situation-aware (dynamic) routing for the efficient utilization of the buffer space at the relaying nodes along the routes may be utilized.

Multiple antenna systems, including beam-forming (one data stream per link) and MIMO (multiple data streams per link) may also be utilized in some embodiments to enhance and optimize the media content distribution performance. In addition, stochastic power control for fast fading channels can be employed, to ensure a certain outage probability for traffic with hard QoS constraints or to maximize the aggregate utility based on the knowledge of the slow fading components and the statistics of the fast-fading components.

In embodiments having multiple cells, sectors, or BS 230s controlled by an RC 220, the RC 220 may allocate nodes to cells or to BS 230s or sectors depending on the load, available resources, interference situation, or other parameters.

End to end communications between peer entities, i.e., peer to peer LC 145s, can be carried via a set of multiple RF links making this connectivity, with different link mar-gins, bandwidths, etc. thus resulting in different data rates and throughputs. Selection of proper link topologies such as point to point, multi-hop, mesh, etc., combined with selection of media distribution schema such broadcasting, multicasting, etc. is used to optimize overall system performance and/or a single peer-to-peer connection.

Packet based protocols such as IP, TCP, UDP, RTCP, etc., can be used for content transmission and routing between the nodes. These protocols can introduce addition transmission overhead bits thereby affecting the actual data throughput, and these protocols can offer more or less reliable transmission. As an example, bits that are sent by UDP are not acknowledged upon receive, thus a sending node does not have knowledge if the sent bits were received correctly, or received in error, or not received at all. Therefore, selection of an appropriate communications protocol or protocols should take into account media QOS and reliability requirements.

Figure 11:
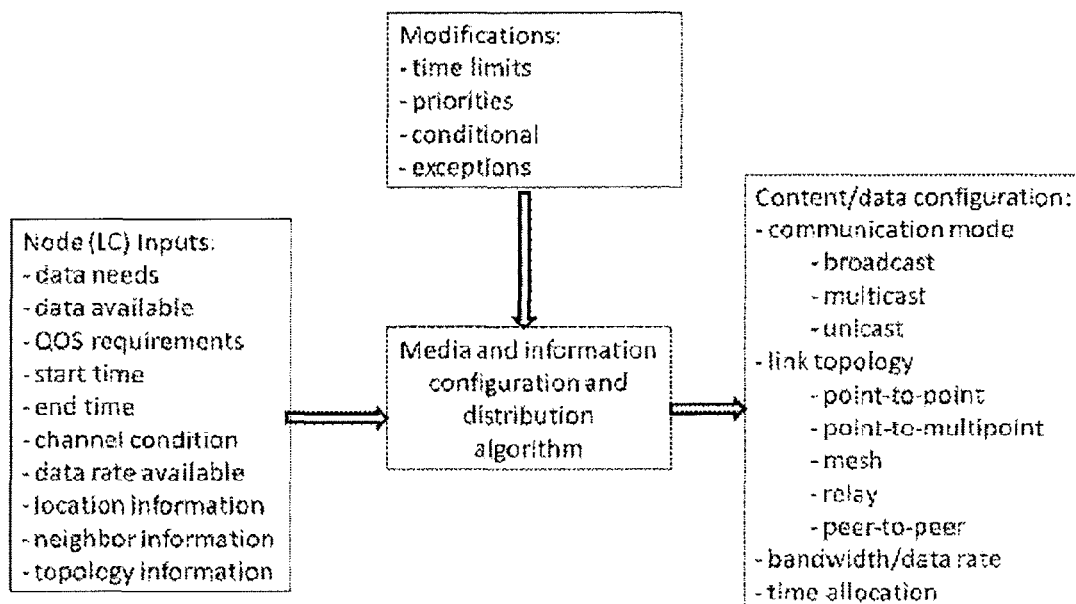
FIG. 11 illustrates one embodiment of a media and information distribution algorithm, in accordance with aspects of the present invention.

Media and information distribution algorithms may be used to create the optimal configurations, topologies, methods, protocols and time schedules to optimize the overall systems performance and to meet performance requirements of each individual node. An example of application of such a media and information configuration and distribution algorithm is shown in FIG. 11. Algorithms or their components may be dynamically distributed among all controllers for optimum performance and scalability.

Figure 12:
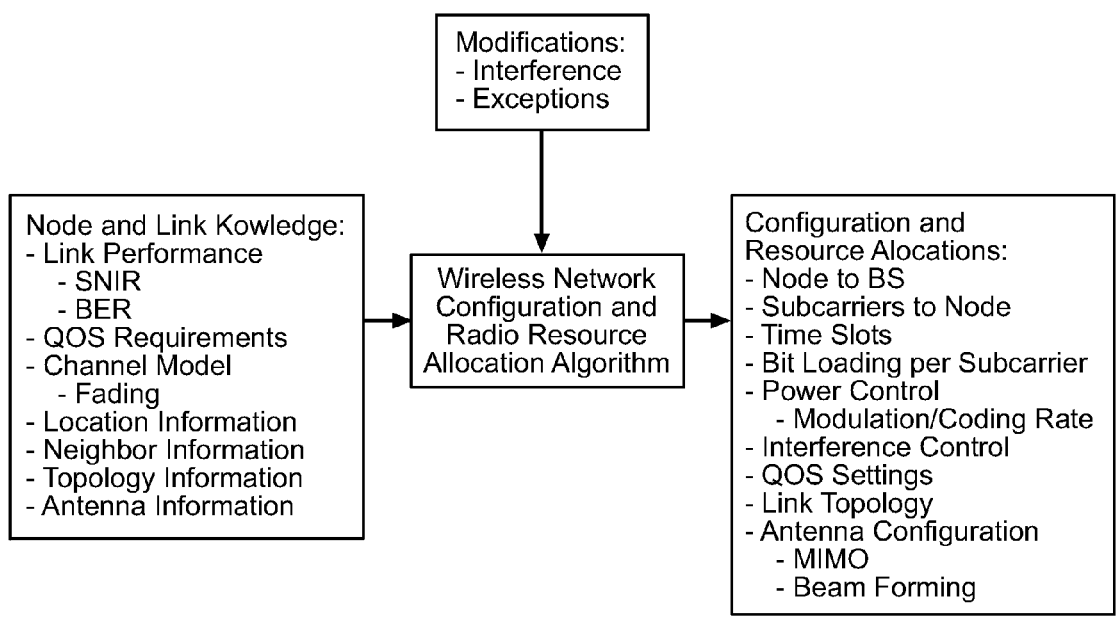
FIG. 12 illustrates one embodiment of a wireless network configuration and radio resource allocation algorithm, in accordance with aspects of the present invention.
Figure 14A:
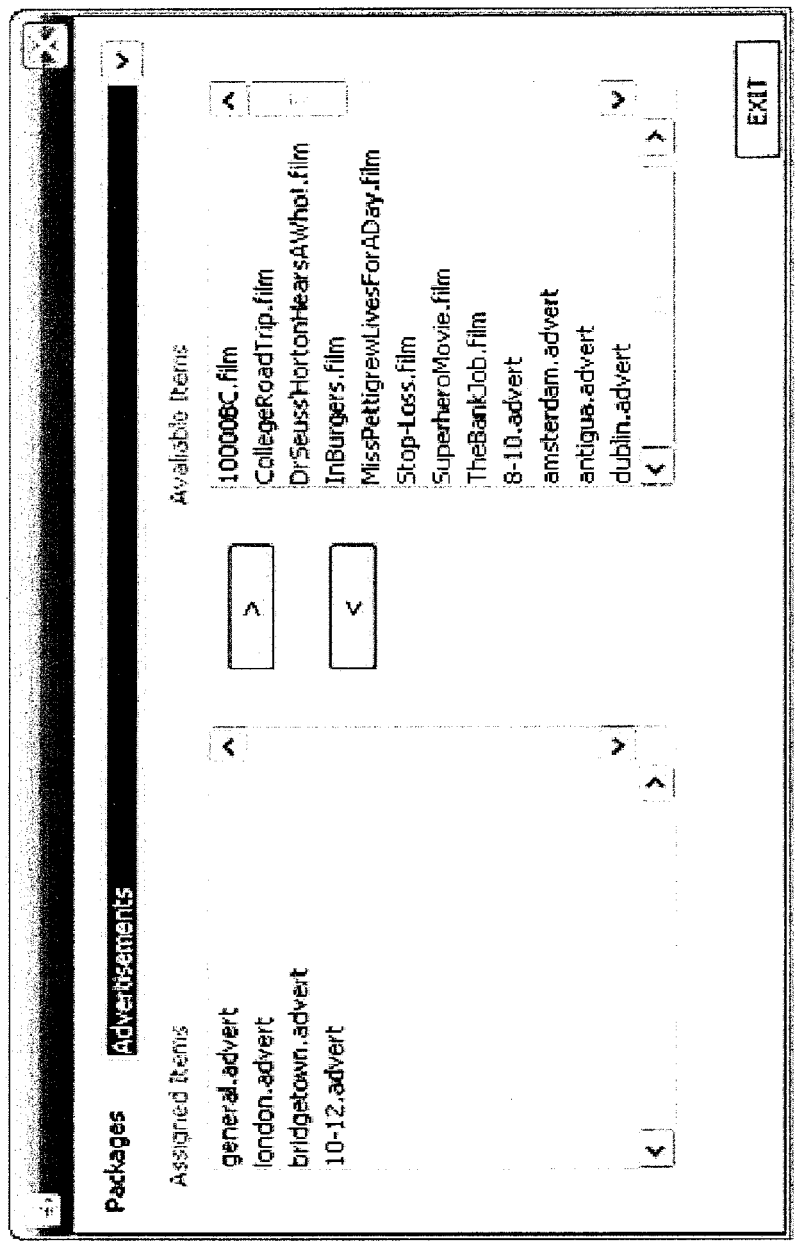
FIG. 14a illustrates a screen shot of an embodiment of advertisement provisioning in accordance with aspect of the present invention.
Figure 14B:
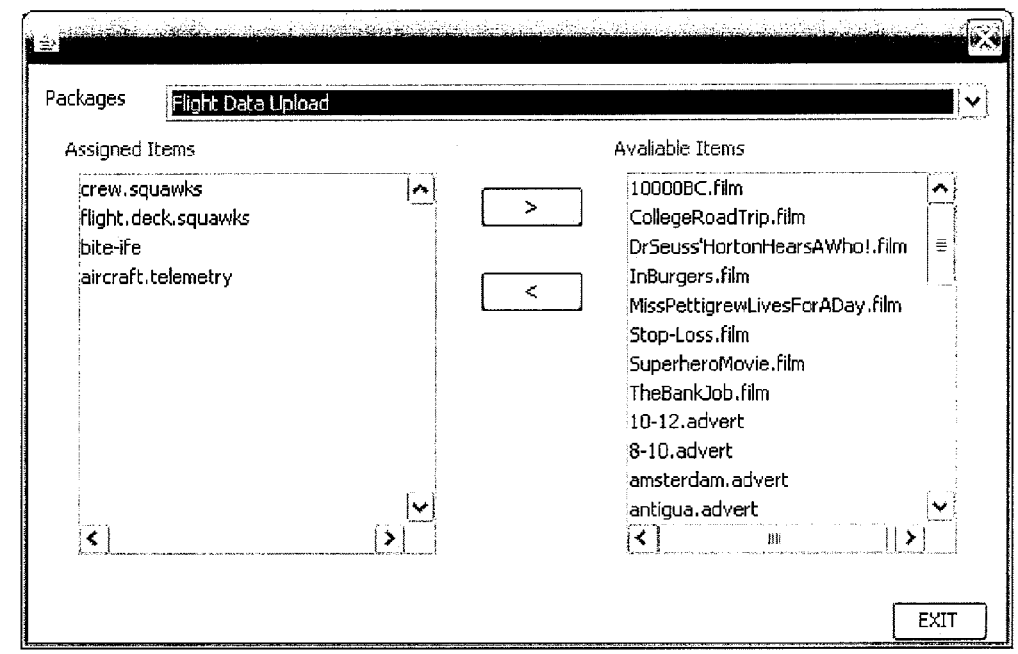
FIG. 14b illustrates a screen shot of an embodiment of flight data upload provisioning in accordance with aspect of the present invention.
Figure 14C:
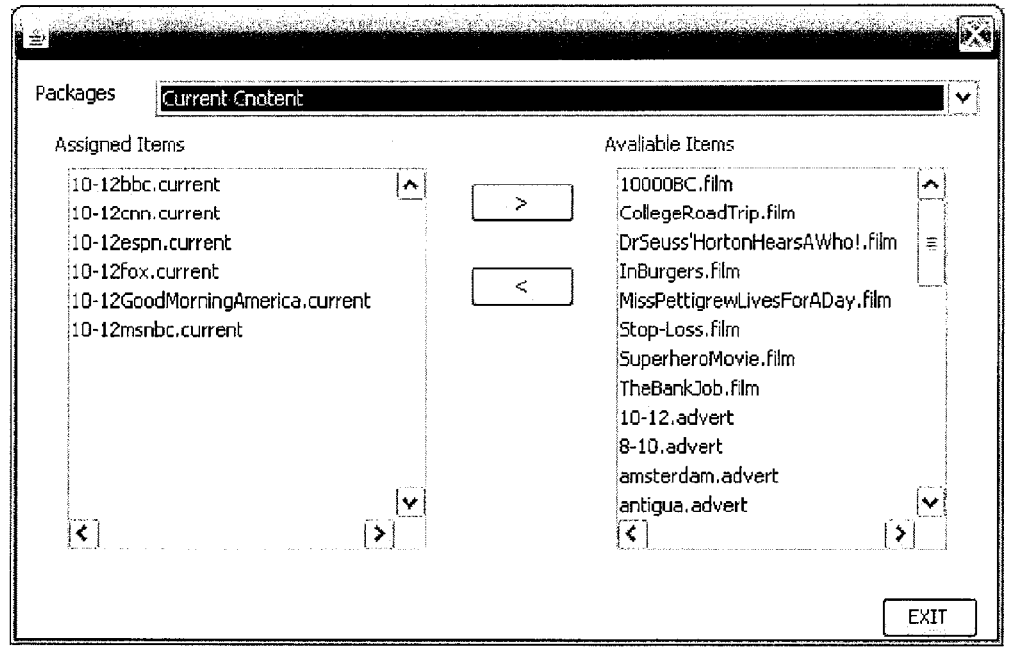
FIG. 14c illustrates a screen shot of an embodiment of current content upload provisioning in accordance with aspect of the present invention.
Figure 14D:
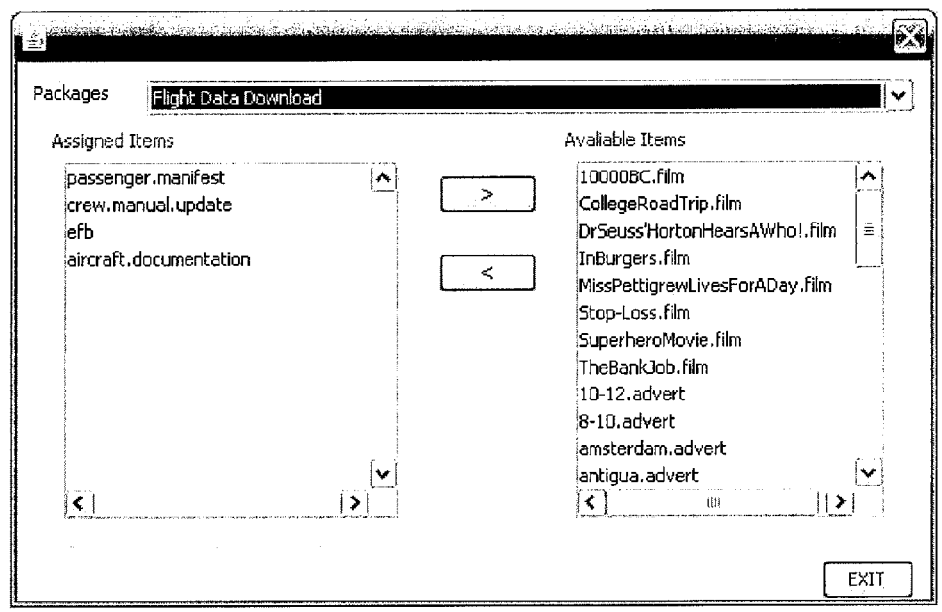
FIG. 14d illustrates a screen shot of an embodiment of flight data download provisioning in accordance with aspect of the present invention.
Figure 14E:
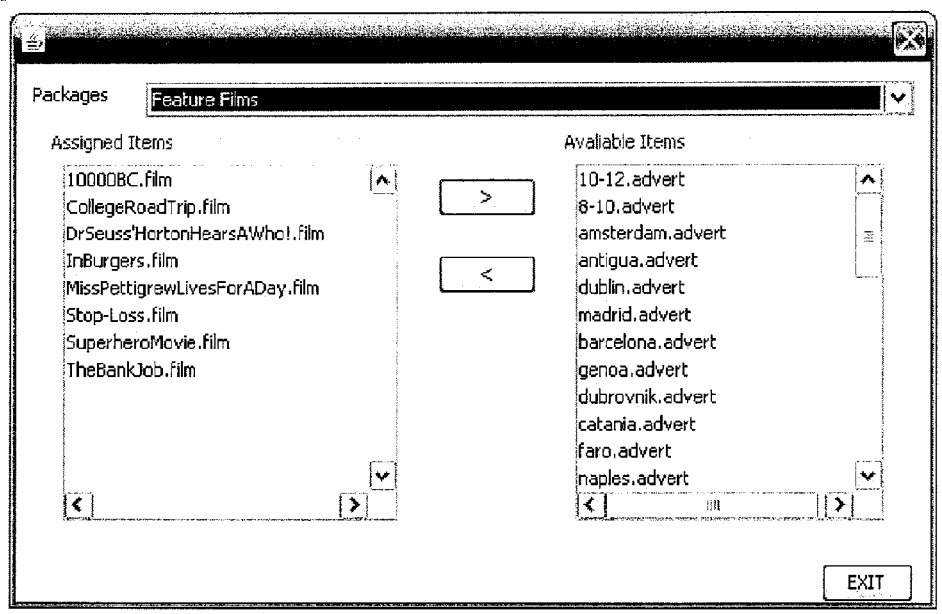
FIG. 14e illustrates a screen shot of an embodiment of packages provisioning in accordance with aspect of the present invention.
Figure 14F:
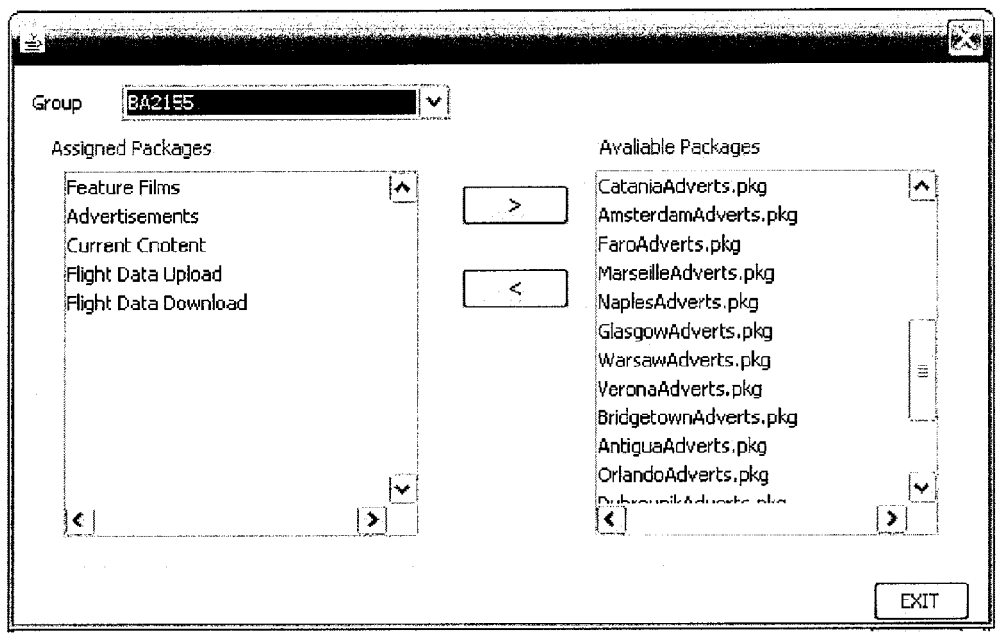

FIG. 12 shows an example of application of a wire-less network configuration and radio resource allocation algorithm for a specific link associated with a specific node. Resource allocation algorithm will use the node and link knowledge to derive optimum device/link/network configuration and resource assignments to meet various optimization goals specified by GS. Dynamic exceptions and varying environmental conditions may also be taken into account.

In various embodiments, the following components/mechanisms for resource allocation and interference management may be used, either individually or jointly:

1. Multiple antenna systems/multiple antenna elements—In some embodiments, in the receiver, transmitter or both, antenna diversity may be implemented using multiple antennas to enhance the spectral efficiency and robustness against fading effects, and to combat the interference.

2. Power control—In some embodiments, location of transmit power to MIMO sub-channels in connection with adaptive modulation, including in mesh modes, can be done.

3. Channel assignment—Channel assignments can be either fixed or dynamic depending on the channel states of the users. In various embodiments, the following channel assignments schemes may be used:

a. AMC (adaptive modulation and coding) mode, where adjacent sub-carriers are grouped to a sub-channel.

b. Interleaved mode where the sub-carriers of each sub-channel are uniformly distributed over the signal band-width at some constant distance.

c. Random mode where randomly distributed subcarriers are grouped to a sub-channel.

d. Sub-carrier assignment where there are no subchannels, each sub-carrier is treated independently.

4. Link activation—In some embodiments, such as in mesh mode implementations, data may be constrained to half-duplex. Therefore, some links might not be activated simultaneously A link activation scheme may be used based on random access or link scheduling protocol.

5. Time-frequency (TF) scheduling—In some embodiments, at the beginning of every frame, the chunks (sub-frame-sub-channel pairs) are allocated to the links or groups of links (in case of multicast) that are active.

6. Multi-hop routing and load balancing—In some embodiments, data packets are transmitted using intermediate airplanes as relay stations. Load balancing is achieved by means of multipath routing where packets are sent over multiple paths to their destinations.

7. Multicast communications—In some embodiments data packets may be prepared and designated for multiple airplanes. Multicast implementations may be used to improve the network performance by reducing the amount of data transmitted to the airplanes.

8. Network coding/Fountain Codes—Network coding may be used to achieve performance gains in networks in which there are several data flows. In traditional implementations, intermediate nodes between sources and destinations always simply forwarded data, and the information flows were treated separately. Using Network coding, intermediate nodes are configured to allowed to process, in addition to forward, data they receive. In general, applying network coding in wireless networks may also bring gains in terms of wireless bandwidths, delay and energy consumption.

9. Peer-to-peer relay communication: Some data packets may be also available at airplanes (intermediate nodes) so that they do not need to be requested from the base station. Instead, the base station only needs to prompt the airplanes to transmit the packets to other airplanes.

Higher-layer specialized protocols, called job schedulers, are used to optimally allocate resources using above mechanisms to achieve the optimization goals. In the context of the present invention, a job refers to the operation of transmitting some specified data packets to one or more aircraft, with possible acknowledgment in response. The job scheduler is a protocol that initiates and interrupts jobs. A set of all jobs at some given time point is called a job request. The job frame is the time between two consecutive time points at which the job scheduler can change a job request. Consequently, job schedulers decide (determine) when and which data packets should be transmitted to which airplanes. At some predefined time points, the job scheduler can intervene into the current data transmission in order to either interrupt some connections or initiate new ones.

In some embodiments, the optimization objective may not need to be to maximize a total throughput at any time point but rather to minimize the time for completing the jobs, possibly within some predefined time period. A job is completed if all the corresponding packets arrive at their destinations. To achieve this objective a transmission policy that aims at minimizing the time which is needed to complete jobs assigned by the job scheduler is used.

Various GS 100 implementations may employ multiple power and sub-channel allocation strategies. These strategies are selected as needed to support various optimizations goals, network configurations and communications modes. These choices include, but are not limited to:

Multiple antenna multicast system with beamforming.

Multiple antenna unicast system with beamforming.

Multiple antenna unicast and multicast system with beamforming.

Multiple antenna multicast system with beam-forming and with fountain coding with or without feedback.

It is noted that in various embodiments the present invention may relate to processes or methods such as are described or illustrated herein and/or in the related applications or described in conjunction with system components. These processes are typically implemented in one or more modules comprising systems as described herein and/or in the related applications, and such modules may include computer software stored on a computer readable medium including instructions configured to be executed by one or more processors. It is further noted that, while the processes described and illustrated herein and/or in the related applications may include particular stages, it is apparent that other processes including fewer, more, or different stages than those described and shown are also within the spirit and scope of the present invention. Accordingly, the processes shown herein and in the related applications are provided for purposes of illustration, not limitation.

As noted, some embodiments of the present invention may include computer software and/or computer hardware/software combinations configured to implement one or more processes or functions associated with the present invention such as those described above and/or in the related applications. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language, Java, C, C#, C++, or other programming languages and software development tools as are known in the art. Other embodiments of the invention may be implemented in hardwired circuitry in place of, or in combination with, machine-executable software instructions.

The description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A system for wirelessly transferring content between aircraft of a plurality of aircraft, the system comprising:
   a first local controller positioned on a first aircraft of the plurality of aircraft;
   a respective second local controller positioned on each of the other aircraft of the plurality of aircraft; wherein:
      each aircraft of the plurality of aircraft is positioned on the ground within a boundary of an airport;
      the airport is located outside a wireless range of all regional controllers, global controllers, repeaters, and base stations that form a GateSync system for distributing content to the plurality of aircraft whereby the plurality of aircraft cannot receive content from the GateSync system while positioned within the boundary of the airport;
      the first local controller operates to:
         establish wireless communication with one or more of the second local controllers;
         identify content assigned to but not available on the first local controller and the one or more second local controllers, the content assigned by an administrator;
         detect content available on the first local controller and the one or more second local controllers;
         control transfer of content between the first local controller and the one or more second local controllers such that the first local controller and the one or more second local controllers receive at least some assigned content that is available.

2. The system of claim 1 wherein the first local controller selects a wireless protocol in accordance with the location of the airport as detected by the first local controller to establish wireless communication.

3. The system of claim 2 wherein the first local controller transmits a beacon in accordance with the wireless protocol to establish wireless communication with the one or more second local controllers.

4. The system of claim 2 wherein the selected wireless protocol comprises a frequency for wireless communication.

5. The system of claim 2 wherein the first local controller receives a GPS coordinate from a Global Positioning System (GPS) receiver to detect the location of the airport.

6. The system of claim 1 wherein the first local controller prioritizes transfer of content in accordance with a departure time of the first local controller and the one or more second local controllers.

7. The system of claim 1 wherein an airline that operates a respective aircraft of the plurality of aircraft selects the content that is needed by the respective local controllers.

8. A system for wirelessly transferring content between aircraft of a plurality of aircraft, the system comprising:
 a first local controller positioned on a first aircraft of the plurality of aircraft;
 a respective second local controller positioned on each of the other aircraft of the plurality of aircraft; wherein:
  each aircraft of the plurality of aircraft is positioned on the ground within a boundary of an airport;
  the first local controller cannot detect any one of a regional controller, a global controller, a repeater, and a base station;
  responsive to not detecting, the first local controller operates to:
   establish wireless communication with one or more of the second local controllers;
   identify content assigned to but not available on the first local controller and the one or more second local controllers, the content assigned by an administrator;
   detect content available on the first local controller and the one or more second local controllers;
   control transfer of content between the first local controller and the one or more second local controllers such that the first local controller and the one or more second local controllers receive at least some assigned content that is available.

9. The system of claim 8 wherein to establish wireless communication, the first local controller:
 transmits a beacon; and
 receives a request from the one or more second local controllers.

10. The system of claim 8 wherein to establish wireless communication, the first local controller:
 detects a geographic location of the first aircraft;
 responsive to detecting, selects a wireless protocol suitable for wireless communication in the geographic area.

11. The system of claim 8 wherein to control transfer of content, the first local controller:
 detects content needed by the first local controller and the one or more local controllers;
 detects content stored by the first local controller and the one or more local controllers; and
 controls the exchange of needed and available content between the first local controller and the one or more second local controllers.

12. The system of claim 8 wherein the first local controller prioritizes transfer of content in accordance with a departure time of the first local controller and the one or more second local controllers.

13. The system of claim 8 wherein an airline that operates a respective aircraft of the plurality of aircraft selects the content that is needed by the respective local controllers.

14. A method for wirelessly transferring content between aircraft of a plurality of aircraft, a first aircraft of the plurality comprising a first local controller, each of the other aircraft of the plurality comprising a respective second controller, each aircraft of the plurality positioned on the ground within a boundary of an airport, the method performed by the first local controller, the method comprising:
 detecting an absence of any of a regional controller;
 detecting an absence of a beacon transmitted from any of the second local controllers;
 responsive to detecting the absence any of the regional controller and the beacon transmitted from any of the second local controllers, establishing communication with one or more second local controllers;
 identify content assigned to but not available on the first local controller and the one or more second local controllers, the content assigned by an administrator;
 detect content available on the first local controller and the one or more second local controllers;
 exchanging content between the first local controller and the one or more second local controllers such that the first local controller and the one or more second local controller receive at least some assigned content that is available.

15. The method of claim 14 wherein establishing communication comprises:
 detecting a geographic location of the first aircraft;
 responsive to detecting, selecting a wireless protocol suitable for wireless communication in the geographic area.

16. The method of claim 14 wherein establishing communication comprises:
 transmitting a beacon; and
 receiving a request to associate from the one or more second controllers.

17. The method of claim 14 wherein the first local controller prioritizes transfer of content in accordance with a departure time of the first local controller and the one or more second local controllers.

18. The method of claim 14 wherein an airline that operates a respective aircraft of the plurality of aircraft selects the content that is needed by the respective local controllers.

* * * * *